(12) United States Patent
Akiyama

(10) Patent No.: US 11,029,233 B2
(45) Date of Patent: Jun. 8, 2021

(54) INPUT/OUTPUT CHARACTERISTIC ESTIMATION METHOD FOR DRIVETRAIN TESTING SYSTEM

(71) Applicant: MEIDENSHA CORPORATION, Tokyo (JP)

(72) Inventor: Takao Akiyama, Tokyo (JP)

(73) Assignee: Meidensha Corporation, Tokyo (JP)

( * ) Notice: Subject to any disclaimer, the term of this patent is extended or adjusted under 35 U.S.C. 154(b) by 112 days.

(21) Appl. No.: 16/492,843

(22) PCT Filed: Mar. 9, 2018

(86) PCT No.: PCT/JP2018/009256
§ 371 (c)(1),
(2) Date: Sep. 10, 2019

(87) PCT Pub. No.: WO2018/164266
PCT Pub. Date: Sep. 13, 2018

(65) Prior Publication Data
US 2020/0264072 A1 Aug. 20, 2020

(30) Foreign Application Priority Data
Mar. 10, 2017 (JP) .............................. JP2017-045875

(51) Int. Cl.
*G01M 15/02* (2006.01)
*G01M 13/02* (2019.01)

(52) U.S. Cl.
CPC ............ *G01M 13/02* (2013.01); *G01M 15/02* (2013.01)

(58) Field of Classification Search
CPC .............................. G01M 13/02; G01M 15/02
(Continued)

(56) References Cited

U.S. PATENT DOCUMENTS 5,060,176 A * 10/1991 Nawa .................. G01M 13/025
701/51
2015/0142341 A1* 5/2015 Akiyama ............ G01M 13/025
702/41

(Continued)

FOREIGN PATENT DOCUMENTS

| JP | H05-215643 A | 8/1993 |
| JP | 2008-076061 | 4/2008 |
| WO | WO 2015/136626 A1 | 9/2015 |

*Primary Examiner* — Eric S. McCall
(74) *Attorney, Agent, or Firm* — Muncy, Geissler, Olds & Lowe, P.C.

(57) ABSTRACT

The input/output characteristic estimation method for testing system comprises; first excitation measurement steps (S3-S5) in which an input obtained by superimposing an excitation input d2 onto a second torque control input ib2 is input to a second dynamometer, and the frequency response i2d2 with respect to the excitation input d2 is measured; second excitation measurement steps (S7-S9) in which input obtained by superimposing excitation input d3 on third torque control input ib3 is input to a third dynamometer, and frequency response i2d3 with respect to the excitation input d3 and the like are measured; and mechanical characteristic estimation steps (S11 and S12) in which the response measured in the first and second excitation measurement steps are used to estimate the transfer function Gt2_i2 and the like from the second or third torque current command signals (i2, i3) to the first or second axial torque detection signals (t2 or t3).

12 Claims, 15 Drawing Sheets

(58) Field of Classification Search
USPC .............. 73/115.01, 116.01, 116.05, 118.01, 73/118.02
See application file for complete search history.

(56) References Cited

U.S. PATENT DOCUMENTS

| | | | |
|---|---|---|---|
| 2016/0109328 A1* | 4/2016 | Kanke | G01M 13/025 73/865.6 |
| 2016/0139002 A1* | 5/2016 | Akiyama | B60C 99/006 73/115.01 |
| 2019/0219481 A1* | 7/2019 | Akiyama | H02P 6/08 |
| 2020/0271539 A1* | 8/2020 | Akiyama | G01M 13/025 |
| 2020/0348206 A1* | 11/2020 | Akiyama | G01M 13/022 |

* cited by examiner

INPUT/OUTPUT CHARACTERISTIC ESTIMATION METHOD FOR DRIVETRAIN TESTING SYSTEM

TECHNICAL FIELD

The present invention relates to an input/output characteristic estimation method for a testing system. More particularly, the present invention relates to an input/output characteristic estimation method which estimates an input/output characteristic from a predetermined input to a predetermined output in a testing system for a test piece including at least two shafts.

BACKGROUND ART

Patent Document 1 shows an engine testing system configured by linking an engine which is a test piece to a dynamometer via a joint shaft (hereinafter, referred to as an "engine bench system"). In the engine bench system, torque, a speed, and others of the dynamometer are controlled by a dynamometer control device, while a throttle opening of the engine is controlled by use of an engine control device. Thereby, durability, fuel efficiency, exhaust gas purification performance, and others of the engine are evaluated. In the engine bench system, a characteristic, particularly, moment of inertia of the engine may be measured before implementation of a test of evaluating performance of the engine, and utilized as a control parameter for torque control or speed control in the dynamometer control device.

Patent Document 1 shows a method of performing excitation control of vibrating torque of a dynamometer linked to the engine via the joint shaft, thereby measuring an input/output characteristic (more specifically, a transfer function G1 from a torque current command signal to an angular speed detection signal, and a transfer function G2 from a torque current command signal to a shaft torque detection signal) of a signal in an engine bench system, and estimating moment of inertia of an engine by utilizing the measurement result. In an engine bench system, only one dynamometer is linked to the engine which is a test piece, so that an input/output characteristic of the engine can be easily measured by measuring a response of a predetermined signal to an excitation input to the dynamometer.

Patent Document 1: Japanese Unexamined Patent Application, Publication No. 2008-76061

DISCLOSURE OF THE INVENTION

Problems to be Solved by the Invention

By the way, testing systems using dynamometers include not only the engine bench system as shown in Patent Document 1 in which the engine is a test piece, but also a drive train bench system in which a drive train of a vehicle is a test piece. A drive train refers to a generic term for a plurality of devices for transmitting energy generated in an engine to a driving wheel, and is configured by combining an engine, a clutch, a transmission, a drive shaft, a propeller shaft, a differential gear, a driving wheel, and others. The drive train has three shafts, including one input shaft linked to an output shaft of the engine, and first and second output shafts connected to the input shaft so as to be able to transmit power.

The drive train bench system connects a power generation source such as an actual engine or a dynamometer to the input shaft of the drive train, controls, by a speed control device, rotation speeds of first and second dynamometers respectively linked to the first and second output shafts while inputting power generated in the power generation source to the input shaft and driving the test piece, and absorbs the power by the first and second dynamometers, thereby evaluating performance of the test piece.

In such a drive train bench system as well as in the engine bench system previously described, it maybe necessary to estimate an input/output characteristic of a signal. However, in the drive train bench system, two or three dynamometers are linked to a test piece in contrast to the engine bench system, and therefore, the input/output characteristic cannot be estimated with accuracy by merely applying the method of the invention in Patent Document 1 as it is. More specifically, in the drive train bench system, not only a dynamometer to be excited but also a dynamometer controlled by the speed control device is connected to a test piece, and therefore, due to the influence of this speed control device, the input/output characteristic cannot be estimated with accuracy by simply measuring a response of a target output signal to an excitation input signal as in the invention in Patent Document 1.

An object of the present invention is to provide an input/output characteristic estimation method for a testing system capable of estimating, with accuracy, an input/output characteristic from a predetermined input to a predetermined output, in a testing system which targets, for testing, a test piece including at least two shafts.

Means for Solving the Problems (1) A testing system (e.g., a testing system S described later) includes: a test piece (e.g., a test piece W described later) including a first shaft (e.g., a first shaft S1 described later), and a second shaft (e.g., a second shaft S2 described later) and a third shaft (e.g., a third shaft S3 described later) connected to the first shaft so as to be able to transmit power; a second electric motor (e.g., a second dynamometer 22 described later) linked to the second shaft; a third electric motor (e.g., a third dynamometer 23 described later) linked to the third shaft; a second state detection means (e.g., a second rotation speed detector 52 and a second shaft torque detector 62 described later) for detecting a state of the second shaft or the second electric motor and generating a second state detection signal (t2 and w2); a third state detection means (e.g., a third rotation speed detector 53 and a third torque detector 63 described later) for detecting a state of the third shaft or the third electric motor and generating a third state detection signal (t3 and w3); a speed control device (e.g., a speed control device 73 described later) which generates a second torque control input (e.g., a second torque control input ib2 described later) to the second electric motor for controlling a rotation speed of the second electric motor and a third torque control input (e.g., a third torque control input ib3 described later) to the third electric motor for controlling a rotation speed of the third electric motor on the basis of a predetermined input signal (w2, w3, w_av, and dw); and an excitation input generation means (e.g., an excitation torque generation unit 72 described later) for generating an excitation input (d1, d2, and d3) changing at a predetermined frequency. An input/output characteristic estimation method for this testing system includes: a first excitation measurement step (e.g., steps of S3 to S5 in FIG. 3 described later) of inputting, to the second electric motor as a second input (i2), the second torque control input (ib2) on which the excitation input (d2) is superimposed, also inputting, to the third electric motor as a third input (i3), the third torque control input (ib3), and measuring a response (e.g., frequency responses i2d2, t2d2, w2d2, i3d2, t3d2, and w3d2 described later) to the excitation input (d2); a second excitation measurement step (e.g., steps of S7 to S9 in FIG. 3 described later) of inputting, to the second electric motor as a second input (i2), the second torque control input (ib2), also inputting, to the third electric motor as a third input, the third torque control input (ib3) on which the excitation input (d3) is superimposed, and measuring a response (e.g., frequency responses i2d3, t2d3, w2d3, i3d3, t3d3, and w3d3 described later) to the excitation input (d3); and a mechanical characteristic estimation step (e.g., steps of S11 to S12 in FIG. 3 described later) of estimating a transfer function (e.g., Gt2_i2, Gt2_i3, Gt3_i2, Gt3_i3, Gw2_i2, Gw2_i3, Gw3_i2, and Gw3_i3 described later) from the second or third input (i2 or i3) to the second or third state detection signal (t2, t3, w2, and w3) by using the response measured in the first excitation measurement step and the response measured in the second excitation measurement step.

(2) In this case, it is preferable that the second state detection means includes a second torque detector (e.g., a second shaft torque detector 62 described later) which detects torque of the second shaft and generates a second torque detection signal (t2), and a second rotation speed detector (e.g., a second rotation speed detector 52 described later) which detects a rotation speed of the second electric motor and generates a second speed signal (w2), the third state detection means includes a third torque detector (e.g., a third shaft torque detector 63 described later) which detects torque of the third shaft and generates a third torque detection signal (t3), and a third rotation speed detector (e.g., a third rotation speed detector 53 described later) which detects a rotation speed of the third electric motor and generates a third speed signal (w3), and the speed control device generates the second and third torque control inputs on the basis of the second and third speed signals, measures the response (i2d2 or i3d2) of at least either the second or third input to the excitation input superimposed on the second torque control input, in the first excitation measurement step, measures the response (i2d3 or i3d3) of at least either the second or third input to the excitation input superimposed on the third torque control input, in the second excitation measurement step, and estimates a transfer function (Gt2_i2, Gt2_i3, Gt3_i2, Gt3_i3, Gw2_i2, Gw2_i3, Gw3_i2, and Gw3_i3) from the second or third input (i2 or i3) to the second or third torque detection signal (t2 or t3) or the second or third speed signal (w2 or w3) by using the responses measured in the first and second excitation measurement steps, in the mechanical characteristic estimation step.

(3) In this case, it is preferable that, in the first excitation measurement step, the responses (i2d2, i3d2, t2d2, and t3d2) of the second input, the third input, the second torque detection signal, and the third torque detection signal to the excitation input are measured, in the second excitation measurement step, the responses (i2d3, i3d3, t2d3, and t3d3) of the second input, the third input, the second torque detection signal, and the third torque detection signal to the excitation input are measured, and in the mechanical characteristic estimation step, a transfer function (Gt2_i2, Gt2_i3, Gt3_i2, and Gt3_i3) from the second or third input to the second or third torque detection signal is estimated by using the responses measured in the first and second excitation measurement steps.

(4) In this case, it is preferable that, in the first excitation measurement step, the responses (i2d2, i3d2, w2d2, and w3d2) of the second input, the third input, the second speed signal, and the third speed signal to the excitation input are measured, in the second excitation measurement step, the responses (i2d3, i3d3, w2d3, and w3d3) of the second input, the third input, the second speed signal, and the third speed signal to the excitation input are measured, and in the mechanical characteristic estimation step, a transfer function (Gw2_i2, Gw2_i3, Gw3_i2, and Gw3_i3) from the second or third input to the second or third speed signal is estimated by using the responses measured in the first and second excitation measurement steps.

(5) In this case, it is preferable that the input/output characteristic estimation method further includes a control circuit characteristic estimation step (e.g., a step of S31 in FIG. 5 described later) of estimating a transfer function from the input signal (w2 or w3) to the second or third input (i2 or i3) in the speed control device by using the response measured in the first excitation measurement step and the response measured in the second excitation measurement step.

(6) In this case, it is preferable that the testing system further includes a first electric motor (e.g., a first dynamometer 21) linked to the first shaft; and a first state detection means (e.g., a first rotation speed detector 51 and a first shaft torque detector 61 described later) for detecting a state of the first shaft or the first electric motor and generating a first state detection signal (t1 and w1), the input/output characteristic estimation method further includes a third excitation measurement step (e.g., steps of S64 to S66 in FIG. 6B described later) of inputting, to the first electric motor as a first input (i1), a predetermined reference input (ib1) on which the excitation input (d1) is superimposed, also inputting the second and third torque control inputs to the second and third electric motors as second and third inputs, and measuring a response (e.g., t1d1, w1d1, t2d1, w2d1, t3d1, and w3d1) to the excitation input, and in the mechanical characteristic estimation step, a transfer function (Gt1_i1, Gt2_i1, Gt3_i1, Gw1_i1, Gw2_i1, and Gw3_i1) from the first input to the first, second, or third state detection signal or a transfer function, (Gt1_i2, Gt1_i3, Gw1_i2, and Gw1_i3) from the second or third input to the first state detection signal is estimated by using the responses measured in one or both of the first and second excitation measurement step and the response measured in the third excitation measurement step.

(7) A testing system includes: a test piece including a first shaft, and a second shaft and a third shaft connected to the first shaft so as to be able to transmit power; a second electric motor linked to the second shaft; a third electric motor linked to the third shaft; a second state detection means for detecting a state of the second shaft or the second electric motor and generating a second state detection signal; a third state detection means for detecting a state of the third shaft or the third electric motor and generating a third state detection signal; a speed control device which generates a second torque control input to the second electric motor for controlling a rotation speed of the second electric motor on the basis of a predetermined input signal, and a third torque control input to the third electric motor for controlling a rotation speed of the third electric motor; and an excitation input generation means for generating an excitation input changing at a predetermined frequency. An input/output characteristic estimation method for this testing system includes: a first excitation measurement step (e.g., steps of S23 to S25 in FIG. 5 described later) of inputting, to the second electric motor as a second input, the second torque control input on which the excitation input is superimposed, also inputting the third torque control input to the third electric motor as a third input, and measuring a response to the excitation input; a second excitation measurement step (e.g., steps of S27 to S29 in FIG. 5 described later) of inputting the second torque control input to the second electric motor as a second input, also inputting, to the third electric motor as a third input, the third torque control input on which the excitation input is superimposed, and measuring a response to the excitation input; and a control circuit characteristic estimation step (e.g., a step of S31 in FIG. 5 described later) of estimating a transfer function (e.g., C22, C23, C32, and C33) from the input signal (w2 or w3) to the second or third input (i2 or i3) in the speed control device by using the response measured in the first excitation measurement step and the response measured in the second excitation measurement step.

(8) In this case, it is preferable that the second state detection means includes a second torque detector which detects torque of the second shaft and generates a second torque detection signal, and a second rotation speed detector which detects a rotation speed of the second electric motor and generates a second speed signal, the third state detection means includes a third torque detector which detects torque of the third shaft and generates a third torque detection signal, and a third rotation speed detector which detects a rotation speed of the third electric motor and generates a third speed signal, and the speed control device generates the second and third torque control inputs on the basis of the second and third speed signals, measures the responses of the second and third speed signals to the excitation input superimposed on the second torque control input, in the first excitation measurement step, measures the responses of the second and third speed signals to the excitation input superimposed on the third torque control input, in the second excitation measurement step, and estimates a transfer function (C22, C23, C32, and C33) from the second or third speed signal to the second or third input in the speed control device by using the responses measured in the first and second excitation measurement steps, in the control circuit characteristic estimation step.

(9) A testing system includes: a test piece (e.g., a test piece W described later) including a first shaft (e.g., a first shaft S1 described later), and a second shaft (e.g., a second shaft S2 or a third shaft S3 described later) connected to the first shaft so as to be able to transmit power; a first electric motor (e.g., a first dynamometer 21) linked to the first shaft; a second electric motor (e.g., a second dynamometer 22 or third dynamometer 23 described later) linked to the second shaft; a first state detection means (e.g., a first rotation speed detector 51 and a first shaft torque detector 61 described later) for detecting a state of the first shaft or the first electric motor and generating a first state detection signal; a second state detection means (e.g., a second rotation speed detector 52 and a second shaft torque detector 62 or a third rotation speed detector 53 and a third torque detector 63 described later) for detecting a state of the second shaft or the second electric motor and generating a second state detection signal; a speed control device (e.g., a speed control device 73 described later) which generates a second torque control input (ib2 or ib3) to the second electric motor for controlling a rotation speed of the second electric motor on the basis of a predetermined input signal (w2 or w3); and an excitation input generation means (e.g., an excitation torque generation unit 72 described later) for generating an excitation input (d1, d2, and d3) changing at a predetermined frequency. An input/output characteristic estimation method for this testing system includes: a first excitation measurement step (e.g., steps of S64 to S66 in FIG. 6B described later) of inputting, to the first electric motor as a first input (i1), a predetermined reference input (ib1) on which the excitation input (d1) is superimposed, also inputting, to the second electric motor as a second input (i2 or i3), the second torque control input (ib2 or ib3), and measuring a response to the excitation input; a second excitation measurement step (e.g., steps of S53 to S55 or steps of S57 to S59 in FIG. 6A described later) of inputting the reference input to the first electric motor as a first input, also inputting, to the second electric motor as a second input, the second torque control input on which the excitation input is superimposed, and measuring a response to the excitation input; and a mechanical characteristic estimation step (e.g., a steps of S68 and S69 in FIG. 6B described later) of estimating a transfer function (e.g., Gt1_Gt2 Gt3_i1, Gw1_i1, Gw2_i1, and Gw3_i1) from the first input to the first or second state detection signal, by using the response (t1d1, w1d1, t2d1, w2d1, t3d1, and w3d1) measured in the first excitation measurement step and the response (i2d2, i2d3, and others) measured in the second excitation measurement step.

(10) In this case, it is preferable that the first state detection means includes a first, torque detector which detects torque of the first shaft and generates a first torque detection signal, and a first rotation speed detector which detects a rotation speed of the first electric motor and generates a first speed signal, the second state detection means includes a second torque detector which detects torque of the second shaft and generates a second torque detection signal, and a second rotation speed detector which detects a rotation speed of the second electric motor and generates a second speed signal, in the first excitation measurement step, the responses of the second speed signal and the first torque detection signal to the excitation input superimposed on the reference input are measured, and in the mechanical characteristic estimation step, a transfer function (Gt1_i1) from the first input to the first torque detection signal is estimated by using the responses measured in the first and second excitation measurement steps.

(11) In this case, it is preferable that, in the first excitation measurement step, the responses of the second speed signal and the first and second torque detection signals to the excitation input superimposed on the reference input are measured, and in the mechanical characteristic estimation step, a transfer function from the first input to the first torque detection signal and a transfer function (Gt2_i1 or Gt3_i1) from the first input to the second torque detection signal are estimated by using the responses measured in the first and second excitation measurement steps.

(12) In this case, it is preferable that the first state detection means includes a first torque detector which detects torque of the first shaft and generates a first torque detection signal, and a first rotation speed detector which detects a rotation speed of the first electric motor and generates a first speed signal, the second state detection means includes a second torque detector which detects torque of the second shaft and generates a second torque detection signal, and a second rotation speed detector which detects a rotation speed of the second electric motor and generates a second speed signal, in the first excitation measurement step, the responses of the first and second speed signals to the excitation input superimposed on the reference input are measured, and in the mechanical characteristic estimation step, a transfer function (Gw1_i1) from the first input to the first speed signal and a transfer function (Gw2_i1 or Gw3_i1) from the first input to the second speed signal are estimated by using the responses measured in the first and second excitation measurement steps.

Effects of the Invention (1) In the present invention, second and third electric motors are respectively linked to second and third shafts of a test piece. In a first excitation measurement step, a response to an excitation input when the second electric motor is excitation-controlled is measured. In a second excitation measurement step, a response to an excitation input when the third electric motor is excitation-controlled is measured. Further, a mechanical characteristic estimation step estimates a transfer function from a second or third input to a second or third state detection signal by using the responses to the excitation input obtained in the first and second excitation measurement steps. In this way, in the present invention, a transfer function from the second or third input to the second or third state detection signal is estimated by combining the response when the second electric motor is excitation-controlled with the response when the third electric motor is excitation-controlled. Thereby, it is possible to eliminate an influence of an input/output characteristic of a speed control device, and thus estimate a transfer function with accuracy.

(2) In a first excitation measurement step of the present invention, responses of second and third inputs to an excitation input which is input to the second electric motor are measured. In a second excitation measurement step, responses of second and third inputs to an excitation input which is input to the third electric motor are measured. A mechanical characteristic estimation step estimates a transfer function from a second or third torque detection signal or second or speed signal by use of the four responses. Consequently, these transfer functions can be estimated with higher accuracy.

(3) In a mechanical characteristic estimation step of the present invention, transfer functions from, a second or third input to a second or third torque detection signal are estimated by use of eight responses including responses of the second and third inputs and the second and third torque detection signals to an excitation input which is input to a second electric motor, and responses of the second and third inputs and the second and third torque detection signals to an excitation input which is input to the third electric motor. Consequently, these transfer functions can be estimated with higher accuracy.

(4) In a mechanical characteristic estimation step of the present invention, transfer functions from, a second or third input to a second or third speed signal are, estimated by use of eight responses including responses of the second and third inputs and the second and third speed signals to an excitation input which is input to a second electric motor, and responses of the second and third inputs and the second and third speed signals to an excitation input which is input to the third electric motor. Consequently, these transfer functions can be estimated with higher accuracy.

(5) In a control circuit characteristic estimation step of the present invention, a transfer function from an input signal to a second or third input in a speed control device is estimated by using responses measured in the first and second excitation measurement steps. In this way, in the present invention, a transfer function representing an input/output characteristic of a speed control device is estimated by combining the response when a second electric motor is excitation-controlled with the response when a third electric motor is excitation-controlled. Thereby, it is possible to estimate the transfer function with accuracy in a state where the speed control device is actually operated. In addition, an actual speed control device is configured by combining various control circuits. Thus, it maybe difficult to operate only a particular control circuit and then estimate an input/output characteristic thereof, or it may take time. In the present invention, an input/output characteristic of a speed control device can be estimated in a state where the speed control device is actually operated. Therefore, the input/output characteristic can be estimated with ease and in a short time.

(6) In the present invention, a first electric motor is linked to a first shaft of a test piece. In a third excitation measurement step, a response to an excitation input when a first electric motor is excitation-controlled is measured. Further, in the mechanical characteristic estimation step, a transfer function from a first input to first to third state detection signals and a transfer function from a second or third input to a first state detection signal are estimated by using responses measured in one or both of first and second excitation measurement steps, and a response measured in a third excitation measurement step. Thereby, according to the present invention, it is possible to eliminate an influence of an input/output characteristic of a speed control device, and thus estimate a transfer function with accuracy.

(7) In the present invention, second and third electric motors are respectively linked to second and third shafts of a test piece. In a first excitation measurement step, a response to an excitation input when the second electric motor is excitation-controlled is measured. In a second excitation measurement step, a response to an excitation input when the third electric motor is excitation-controlled is measured. Further, in the control circuit characteristic estimation step, a transfer function from an input signal to a second or third input in the speed control device is estimated by using responses measured in the first and second excitation measurement steps. In this way, in the present invention, a transfer function representing an input/output characteristic of a speed control device is estimated by combining the response when the second electric motor is excitation-controlled with the response when the third electric motor is excitation-controlled. Thereby, it is possible to estimate the transfer function with accuracy in a state where the speed control device is actually operated. In addition, an actual speed control device is configured by combining various control circuits. Thus, it may be difficult to operate only a particular control circuit and then estimate an input/output characteristic thereof, or it may take time. In the present invention, an input/output characteristic of a speed control device can be estimated in a state where the speed control device is actually operated. Therefore, the input/output characteristic can be estimated with ease and in a short time.

(8) In a first excitation measurement step of the present invention, responses of second and third speed signals to an excitation input, which is input to the second electric motor are measured. In a second excitation measurement step, responses of second and third speed signals to an excitation input which is input to the third electric motor are measured. In a control circuit characteristic estimation step, a transfer function from the second or third speed signal to the second or third speed signal in the speed control device is estimated by use of the four responses. Consequently, these transfer functions can be estimated with higher accuracy.

(9) In the present invention, first and second electric motors are respectively linked to first and second shafts of a test piece, and a rotation speed of the second electric motor is controlled by a speed control device. In a first excitation measurement step, a response to an excitation input when the first electric motor is excitation-controlled is measured. In a second excitation measurement step, a response to an excitation input when the second electric motor is excitation-controlled is measured. Further, in a mechanical characteristic estimation step, a transfer function from a first input to a first or second state detection signal is estimated by using the responses to the excitation input obtained in the first and second excitation measurement steps. In this way, in the present invention, a transfer function from the first input to the first or second state detection signal is estimated by combining the response when the first electric motor is excitation-controlled with the response when the second electric motor is excitation-controlled. Thereby, it is possible to eliminate an influence of an input/output characteristic of a speed control device, and thus estimate a transfer function with accuracy.

(10) In a first excitation measurement step of the present invention, responses of a second speed signal and a first torque detection signal to an excitation input which is input to the first electric motor are measured. In a mechanical characteristic estimation step, a transfer function from the first input to the first torque detection signal is estimated by use of the two responses measured in the first excitation measurement step and the response measured in the second excitation measurement step. Consequently, this transfer function can be estimated with higher accuracy.

(11) In a first excitation measurement step of the present invention, responses of a second speed signal and first and second torque detection signals to an excitation input which is input to the first electric motor are measured. In a mechanical characteristic estimation step, a transfer function from the first input to the first torque detection signal, and a transfer function from the first input to the second torque detection signal are estimated by use of the three responses measured in the first excitation measurement step and the response measured in the second excitation measurement step. Consequently, these transfer functions can be estimated with higher accuracy.

(12) In a first excitation measurement step of the present invention, responses of first and second speed signals to an excitation input which is input to the first electric motor are measured. In a mechanical characteristic estimation step, a transfer function from the first input to the first speed signal, and a transfer function from the first input to the second speed signal are estimated by use of the two responses measured by the first excitation measurement step and the response measured by the second excitation measurement step. Consequently, these transfer functions can be estimated with higher accuracy.

PREFERRED MODE FOR CARRYING OUT THE INVENTION

Figure 1:
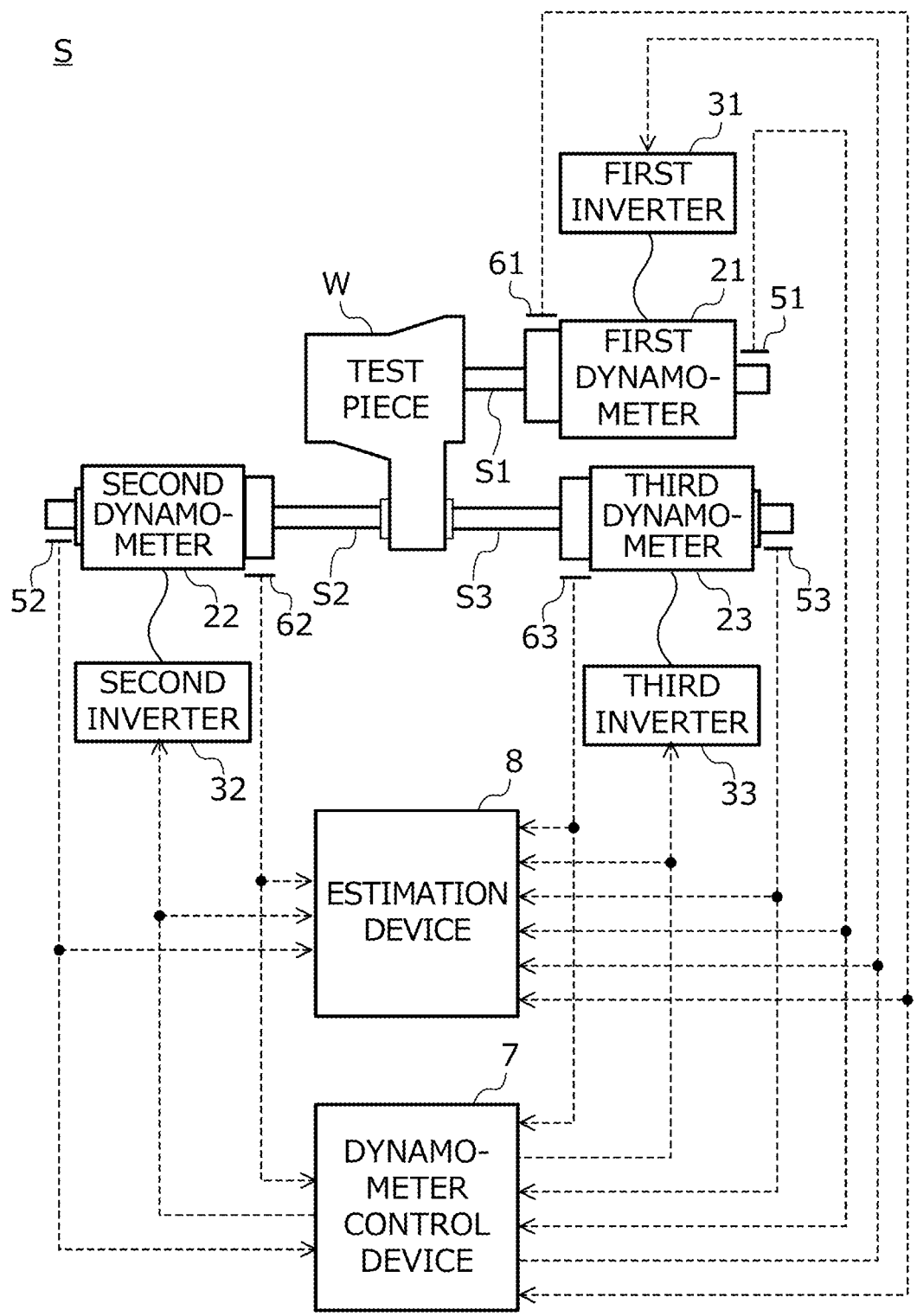
FIG. 1 is a diagram illustrating a configuration of a testing system and an input/output characteristic estimation method thereof according to one embodiment of the present invention.

Hereinafter, one embodiment of the present invention will be described in detail with reference to the drawings. FIG. 1 is a diagram illustrating a configuration of a testing system S to which an input/output characteristic estimation method according to the present embodiment is applied. The testing system S is intended to evaluate performance of a test piece W, using, as the test piece W, a drive train including a first shaft S1 as at least one input shaft, and a second shaft S2 and a third shaft S3 as output shafts each connected to the first shaft S1 so as to be able to transmit power.

The testing system S includes the test piece W, a first dynamometer 21, a second dynamometer 22, and a third dynamometer 23 linked to the test piece W, a first inverter 31, a second inverter 32, and a third inverter 33 which supply electric power to the respective dynamometers 21 to 23, a first rotation speed detector 51, a second rotation speed detector 52, and a third rotation speed detector 53 which detect rotation speeds of shafts in the respective dynamometers 21 to 23, a first shaft torque detector 61, a second shaft torque detector 62, and a third torque detector 63 which detect shaft torque in the respective dynamometers 21 to 23, a dynamometer control device 7 which inputs a torque current command signal to each of the inverters 31 to 33, and an estimation device 8 which estimates an input/output characteristic from a predetermined input to a predetermined output in the testing system S.

An output shaft of the first dynamometer 21 is coaxially linked to the first shaft S1 of the test piece W. An output shaft of the second dynamometer 22 is coaxially linked to the second shaft S2 of the test piece W. An output shaft of the third dynamometer 23 is coaxially linked to the third shaft S3 of the test piece W.

The first rotation speed detector 51 detects a first rotation speed which is the number of rotations per unit time of the output shaft of the first dynamometer 21, and generates a first speed detection signal w1 associated with the first rotation speed. The second rotation speed detector 52 detects a second rotation speed which is the number of rotations per unit time of the output shaft of the second dynamometer 22, and generates a second speed detection signal w2 associated with the second rotation speed. The third rotation speed detector 53 detects a third rotation speed which is the number of rotations per unit time of the output shaft of the third dynamometer 23, and generates a third speed detection signal w3 associated with the third rotation speed.

The first shaft torque detector 61 detects torsional torque (hereinafter, referred to as a "first shaft torque") generated in the first shaft S1, and generates a first shaft torque detection signal t1 associated with the first shaft torque. The second shaft torque detector 62 detects torsional torque (hereinafter, referred to as a "second shaft torque") generated in. the second shaft S2, and generates a second shaft torque detection signal t2 associated with the second shaft torque. The third torque detector 63 detects torsional torque (hereinafter, referred to as a "third shaft torque") generated in the third shaft S3, and generates a third shaft torque detection signal t3 associated with the third shaft torque.

The dynamometer control device 7 generates, on the basis of a predetermined algorithm, a first torque current command signal i1 which is a torque current command signal to the first dynamometer 21, a second torque current command signal i2 which is a torque current command signal to the second dynamometer 22, and a third torque current command signal i3 which is a torque current command signal to the third dynamometer 23, by using the speed detection signals w1 to w3, the shaft torque detection signals t1 to t3, and a predetermined command signal, and inputs each of the signals it to i3 to each of the inverters 31 to 33. The first inverter 31 supplies electric power associated with the first torque current command signal i1 to the first dynamometer 21. The second inverter 32 supplies electric power associated with the second torque current command signal i2 to the second dynamometer 22. The third inverter 33 supplies electric power associated with the third torque current command signal i3 to the third dynamometer 23.

The estimation device 8 estimates an input/output characteristic from a predetermined input signal to a predetermined output signal in the testing system S by using the speed detection signals w1 to w3, the shaft torque detection signals t1 to t3, and the torque current command signals i1 to i3, under control of the respective dynamometers 21 to 23 by the dynamometer control device 7 described above.

Figure 2:
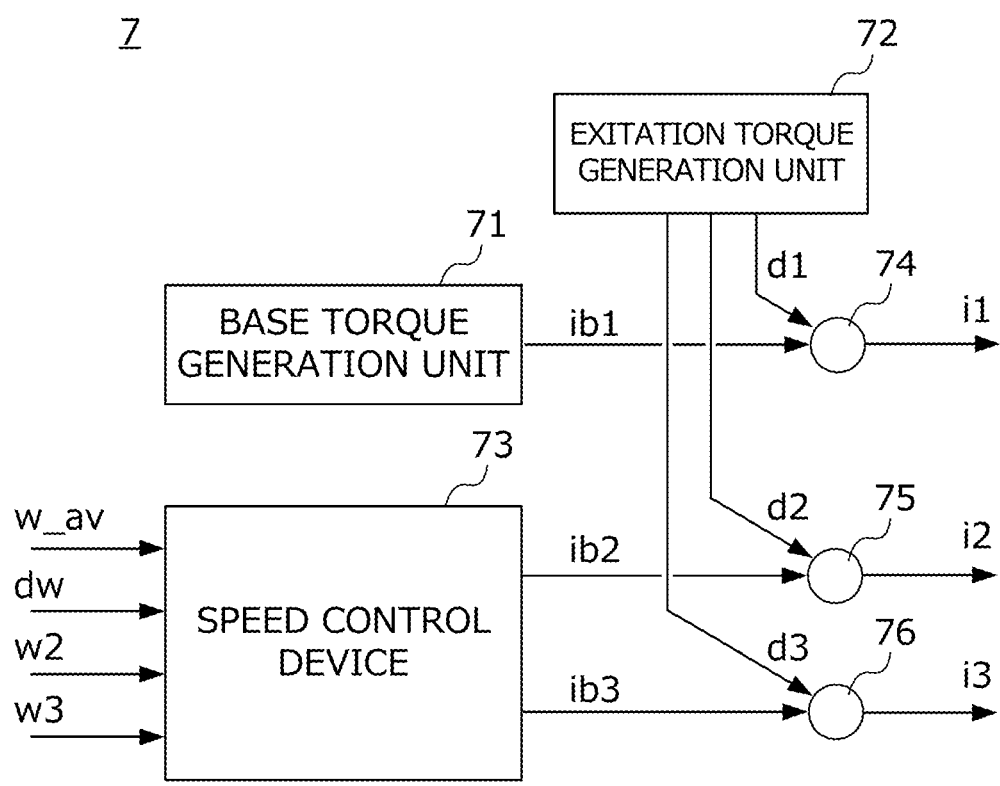
FIG. 2 is a diagram illustrating a configuration of a control circuit of a dynamometer control device when an input/output characteristic is estimated.

FIG. 2 is a diagram illustrating a configuration of a control circuit of the dynamometer control device 7. More specifically, FIG. 2 illustrates, out of the control circuit configured in the dynamometer control device 7, only parts used when an input/output characteristic of the testing system S is estimated by use of the estimation device 8.

The dynamometer control device 7 includes a base torque generation unit 71, an excitation torque generation unit 72, a speed control device 73, a first command signal generation unit 74, a second command signal generation unit 75, and a third command signal generation unit 76. When an input/output characteristic is estimated, the dynamometer control device 7 generates the torque current command signals i1 to i3 by using the above components.

The base torque generation unit 71 generates a base torque command signal ib1 of certain magnitude which does not temporally change. In response to a predetermined request, the excitation torque generation unit 72 generates a first excitation torque input d1, a second excitation torque input d2, and a third excitation torque input d3 which randomly vary under a predetermined excitation frequency within a predetermined range around 0.

The first command signal generation unit 74 outputs the first base torque command signal ib1 as the first torque current command signal i1, when the first excitation torque input d1 is not generated. The first command signal generation unit 74 outputs, as the first torque current command signal i1, the base torque command signal ib1 on which the first excitation torque input d1 is superimposed, when the first excitation torque input d1 is generated.

The speed control device 73 generates a second torque control input ib2 which is an input to the second dynamometer 22 and a third torque control input ib3 which is an input to the third dynamometer 23 for controlling the second rotation speed and the third rotation speed to a predetermined target by using a predetermined command signal, the second speed detection signal w2, and the third speed detection signal w3. More specifically, when an average speed command signal w_av which is a command signal to an average speed of the second rotation speed and the third rotation speed and which does not temporally change, and a difference speed command signal dw (hereinafter, assumed to be 0) which is a command signal to a difference between the second rotation speed and the third rotation speed and which does not temporally change are input, the speed control device 73 generates the second torque control input ib2 and the third torque control input ib3 by a known feedback algorithm so that an average ((w2+w3)/2) of the second speed detection signal w2 and the third speed detection signal w3 becomes the average speed command signal w_av and so that a difference (w2−w3) between the second speed detection signal w2 and the third speed detection signal w3 becomes the difference speed command signal dw.

The second command signal generation unit 75 outputs the second torque control input ib2 as the second torque current command signal i2, when the second excitation torque input. d2 is not generated. The second command signal generation unit 75 outputs, as the second torque current command signal i2, the second torque control input ib2 on which the input d2 is superimposed, when the second excitation torque input d2 is generated.

The third command signal generation unit 76 outputs the third torque control input ib3 as the third torque current command signal i3, when the third excitation torque input d3 is not generated. The third command signal generation unit 76 outputs, as the third torque current command signal i3, the third torque control input ib3 on which the third excitation torque input d3 is superimposed, when the third excitation torque input d3 is generated.

As described, above, the dynamometer control device 7 performs excitation control by appropriately superimposing the first excitation torque input d1 while performing torque current control using the base torque command signal ib1 with regard to the first dynamometer 21, when an input/output characteristic of the testing system S is estimated. Further, the dynamometer control device 7 performs excitation control by appropriately superimposing the excitation torque inputs d2 and d3 while performing speed control using the speed detection signals w2 and w3 with regard to the second and third dynamometers 22 and 23, when an input/output characteristic of the testing system S is estimated.

Returning to FIG. 1, by controlling each of the dynamometers 21 to 23 by the dynamometer control device 7 as described above, the estimation device 8 estimates a transfer function matrix Gti representing a mechanical characteristic (hereinafter, the characteristic is also referred to as a "torque command—shaft torque characteristic") from each of the torque current command signals i1 to i3 to each of the shaft torque detection signals t1 to t3, a transfer function matrix Gwi representing a mechanical characteristic (hereinafter, the characteristic is also referred to as a "torque command—rotation speed characteristic") from each of the torque current command signals i1 to i3 to each of the speed detection signals w1 to w3, and a transfer function matrix C representing an input/output characteristic (hereinafter, also referred to as a "control circuit characteristic") of the speed control device 73 from each of the speed detection signals w2 and w3 to each of the torque control inputs ib2 and ib3.

First, the transfer function matrix Gti representing a torque command—shaft torque characteristic is represented by a 3×3 matrix configured by a total of nine independent components, as indicated in the following Equation (1). In the following Equation (1), for example, a transfer function Gt1_i1 which is a component in the first column and first row of the matrix Gti represents a mechanical characteristic of the first shaft torque detection signal t1 to the first torque current command signal i1. Further, a transfer function Gt1_i2 which is a component in the second column and first row of the matrix Gti represents a mechanical characteristic of the first shaft torque detection signal t1 to the second torque current command signal i2. The same also applies to other components, and a description thereof is omitted.

$$\begin{pmatrix} t1 \\ t2 \\ t3 \end{pmatrix} = Gti \cdot \begin{pmatrix} i1 \\ i2 \\ i3 \end{pmatrix} \equiv \begin{pmatrix} Gt1\_i1 & Gt1\_i2 & Gt1\_i3 \\ Gt2\_i1 & Gt2\_i2 & Gt2\_i3 \\ Gt3\_i1 & Gt3\_i2 & Gt3\_i3 \end{pmatrix} \cdot \begin{pmatrix} i1 \\ i2 \\ i3 \end{pmatrix} \quad (1)$$

Furthermore, the transfer function matrix Gwi representing a torque command—rotation speed characteristic is represented by a 3×3 matrix configured by a total of nine independent components, as indicated in the following Equation (2). In the following Equation (2), for example, a transfer function Gw1_i1 which is a component in the first column and first row of the matrix Gwi represents a transfer function of a mechanical characteristic of the first speed detection signal w1 to the first torque current command signal i1. Further, a transfer function Gw1_i2 which is a component in the second column and first row of the matrix Gwi represents a transfer function of a mechanical characteristic of the first speed detection signal w1 to the second torque current command signal i2. The same also applies to other components, and a description thereof is omitted.

$$\begin{pmatrix} w1 \\ w2 \\ w3 \end{pmatrix} = Gwi \cdot \begin{pmatrix} i1 \\ i2 \\ i3 \end{pmatrix} \equiv \begin{pmatrix} Gw1\_i1 & Gw1\_i2 & Gw1\_i3 \\ Gw2\_i1 & Gw2\_i2 & Gw2\_i3 \\ Gw3\_i1 & Gw3\_i2 & Gw3\_i3 \end{pmatrix} \cdot \begin{pmatrix} i1 \\ i2 \\ i3 \end{pmatrix} \quad (2)$$

Furthermore, in the dynamometer control device 7 as illustrated in FIG. 2, an input/output characteristic from the speed detection signals w1 to w3 and the excitation torque inputs d1 to d3 which are inputs to the dynamometer control device 7, to the torque current command signals i1 to i3 which are inputs to the dynamometer control device 7 is represented by the following Equation (3) by use of a 3×3 unit matrix, and a transfer function matrix C representing a control circuit characteristic of the speed control device 73. In addition, in the calculation in the estimation device 8, a frequency characteristic when excitation is made by use of the excitation torque inputs d1 to d3 is measured, so that the base torque command signal ib1, the average speed command signal w_av, and the difference speed command signal dw which do not temporally change can be negligible, as indicated in the following Equation (3). Further, in the speed control device 73, the two torque control inputs ib2 and ib3 are generated using the two speed detection signals w2 and w3, so that the transfer function matrix C thereof is substantially represented by a 2×2 matrix as indicated in the following Equation (3). In the following Equation (3), for example, a transfer function C22 which is a component in the second column and second row of the matrix C represents a transfer function of the second torque control input ib2 to the second speed detection signal w2 in, the speed control device 73. Further, a transfer function C23 which is a component in the third column and second row of the matrix C represents a transfer function of the second torque control input ib2 to the third speed detection signal w3 in the speed control device 73. The same also applies to other components, and a description thereof is omitted.

$$\begin{pmatrix} i1 \\ i2 \\ i3 \end{pmatrix} = I \cdot \begin{pmatrix} d1 \\ d2 \\ d3 \end{pmatrix} + C \cdot \begin{pmatrix} w1 \\ w2 \\ w3 \end{pmatrix} \quad (3)$$

$$\equiv \begin{pmatrix} 1 & 0 & 0 \\ 0 & 1 & 0 \\ 0 & 0 & 1 \end{pmatrix} \begin{pmatrix} d1 \\ d2 \\ d3 \end{pmatrix} + \begin{pmatrix} 0 & 0 & 0 \\ 0 & C22 & C23 \\ 0 & C32 & C33 \end{pmatrix} \cdot \begin{pmatrix} w1 \\ w2 \\ w3 \end{pmatrix}$$

Example 1

Next, an input/output characteristic estimation method in Example 1 using the, testing system as above is described. The input/output characteristic estimation method in Example 1 estimates a transfer function from the second torque current command signal i2 or the third torque current command signal i3 to the second shaft torque detection signal t2 or the third shaft torque detection signal t3 (i.e., in the matrix Gti in Equation (1), four transfer functions including the component Gt2_i2 in the second column and second row, the component Gt2_i3 in the third column and second row, the component Gt3_i2 in the second column and third row, and the component Gt3_i3 in the third column and third row), and a transfer function from the second torque current command signal i2 or the third torque current command signal i3 to the second speed detection signal w2 or the third speed detection signal w3 (i.e., in the transfer function matrix Gwi in Equation (2), four transfer functions including the component Gw2_i2 in the second column and second row, the component Gw2_i3 in the third column and second row, the component Gw3_i2 in the second column and third row, and the component Gw3_i3 in the third column and third row).

Figure 3:
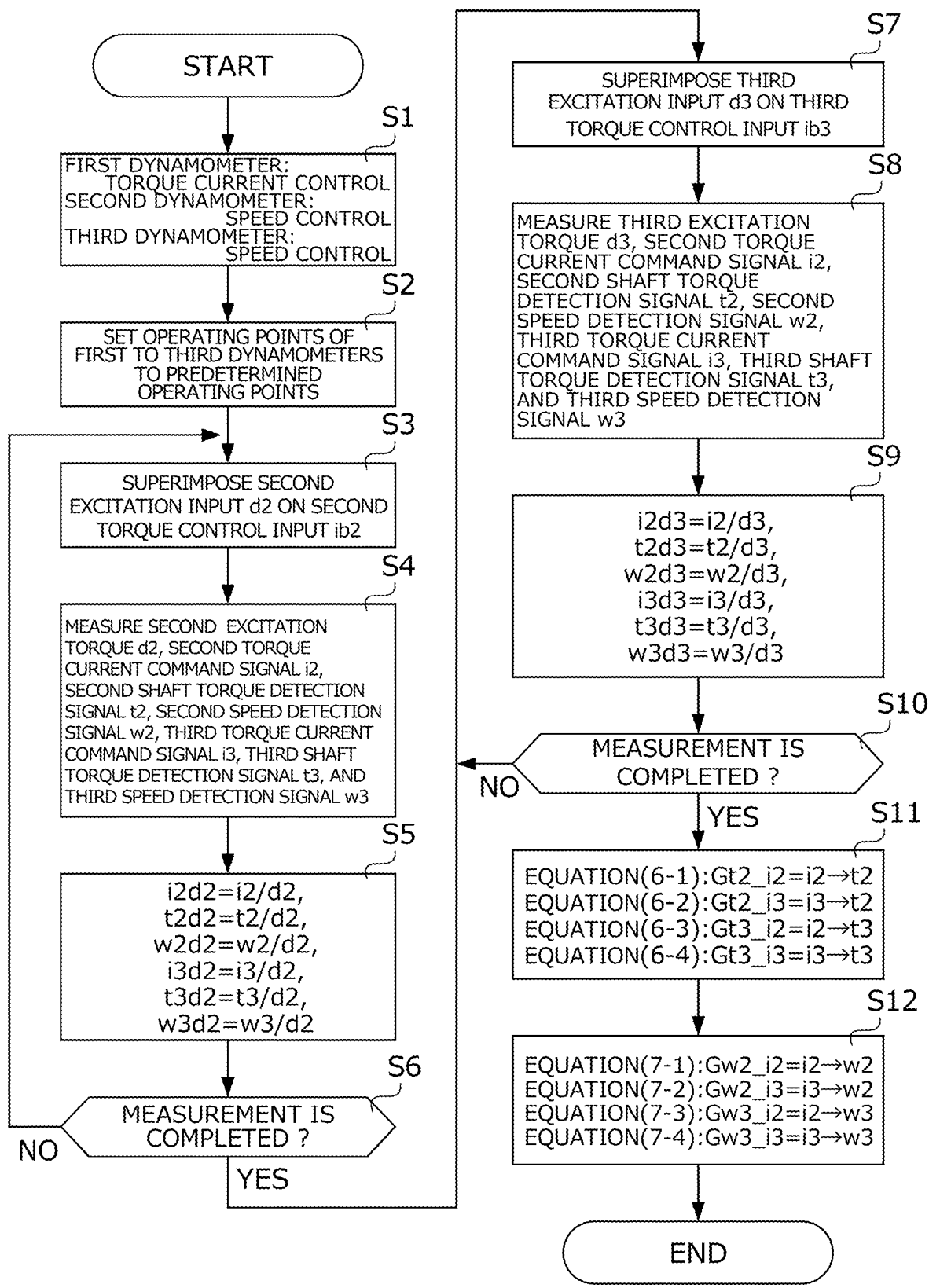
FIG. 3 is a flowchart illustrating a specific calculation procedure of an input/output characteristic estimation method in Example 1.

FIG. 3 is a flowchart illustrating a specific calculation procedure for estimating an input/output characteristic by the input/output characteristic estimation method in Example 1. In S1, control of the first to third dynamometers using the dynamometer control device illustrated in FIG. 2 is started. In other words, the first dynamometer performs torque current control using the base torque command signal ib1, and the second and third dynamometers perform speed control using the speed detection signals w2, w3, and others. In addition, each of the excitation torque inputs d1 to d3 is assumed to be 0.

In S2, the dynamometer control device sets operating points of the first to third dynamometers to operating points predetermined for measurement of an input/output characteristic. More specifically, while keeping all the excitation torque inputs d1 to d3 at 0, the dynamometer control device keeps the base torque command signal ib1 constant at a predetermined given value, keeps the average speed command signal w_av constant at a predetermined given value, and sets the difference speed command signal dw at 0.

In S3, while maintaining the base torque command signal, the average speed command signal, and the difference speed command signal at the operating points in S2, the dynamometer control device generates the second excitation torque input d2 varying at a predetermined excitation frequency, superimposes the second excitation torque input d2 on the second torque control input ib2, and vibrates the second torque current command signal i2. In addition, in this instance, each of the other excitation torque inputs d1 and d3 is assumed to be 0.

In S4, the estimation device measures the second excitation torque input d2, the second torque current command signal i2, the second shaft torque detection signal t2, the second speed detection signal w2, the third torque current command signal i3, the third shaft torque detection signal t3, and the third speed detection signal w3.

In S5, the estimation device measures six frequency responses i2d2, t2d2, w2d2, i3d2, t3d2, and w3d2 as indicated in the following Equations (4-1) to (4-6), by calculating ratios between the second excitation torque input d2 measured in S4 and the other output signals i2, t2, w2, i3, t3, and w3. Here, i2d2 represents a frequency response of the second torque current command signal i2 to the second excitation torque input d2 input to the second dynamometer 22, t2d2 represents a frequency response of the second shaft torque detection signal t2 to the input d2, w2d2 represents a frequency response of the second-speed detection signal w2 to the input d2, i3d2 represents a frequency response of the third torque current command signal i3 to the input d2, t3d2 represents a frequency response of the third shaft torque detection signal t3 to the input d2, and w3d2 represents a frequency response of the third speed detection signal w3 to the input d2.

$$i2d2=i2/d2 \tag{4-1}$$

$$t2d2=t2/d2 \tag{4-2}$$

$$w2d2=w2/d2 \tag{4-3}$$

$$i3d2=i3/d2 \tag{4-4}$$

$$t3d2=t3/d2 \tag{4-5}$$

$$w3d2=w3/d2 \tag{4-6}$$

In S6, the estimation device determines whether or not measurement of the six frequency responses i2d2 and others is completed within a predetermined frequency region. When the determination in S6 is NO, the estimation device returns to S3, changes the excitation frequency of the second excitation torque input d2, and then again executes the processing of S4 and S5. When the determination in S6 is YES, the estimation device shifts to S7.

In S7, while maintaining the base torque command signal, the average speed command signal, and the difference speed command signal at the operating points in S2, the dynamometer control device generates the third excitation torque input d3 varying at a predetermined excitation frequency, superimposes the third excitation torque input d3 on the third torque control input ib3, and vibrates the third torque current command signal i3. In addition, in this instance, each of the other excitation torque inputs d1 and d2 is assumed to be 0.

In S8, the estimation device measures the third excitation torque input d3, the second torque current command signal i2, the second shaft torque detection signal t2, the second speed detection signal w2, the third torque current command signal i3, the third shaft torque detection signal t3, and the third speed detection signal w3.

In S9, the estimation device measures six frequency responses i2d3, t2d3, w2d3, i3d3, t3d3, and w3d3 as indicated in the following Equations (5-1) to (5-6), by calculating ratios between the third excitation torque input d3 measured in S8 and the other output signals i2, t2, w2, i3, t3, and w3. Here, i2d3 represents a frequency response of the second torque current command signal i2 to the third excitation torque input d3 input to the third dynamometer 23, t2d3 represents a frequency response of the second shaft torque detection signal t2 to the input d3, w2d3 represents a frequency response of the second speed detection signal w2 to the input d3, i3d3 represents a frequency response of the third torque current command signal i3 to the input d3, t3d3 represents a frequency response of the third shaft torque detection signal t3 to the input d3, and w3d3 represents a frequency response of the third speed detection signal w3 to the input d3.

$$i2d3=i2/d3 \tag{5-1}$$

$$t2d3=t2/d3 \tag{5-2}$$

$$w2d3=w2/d3 \tag{5-3}$$

$$i3d3=i3/d3 \tag{5-4}$$

$$t3d3=t3/d3 \tag{5-5}$$

$$w3d3=w3/d3 \tag{5-6}$$

In S10, the estimation device determines whether or not measurement of the six frequency responses i2d3 and others is completed within a predetermined frequency region. When the determination in S10 is NO, the estimation device returns to S7, changes the excitation frequency of the third excitation torque input d3, and then again executes the processing of S8 and S9. When the determination in S10 is YES, the estimation device shifts to S11.

In S11, the estimation device calculates four pairs of transfer functions Gt2_i2, Gt2_i3, Gt3_i2, and Gt3_i3 by using the eight pairs of frequency responses i2d2, t2d2, i2d3, t2d3, 13d2, t3d2, i3d3, and t3d3 measured by the processing described above, and finishes this processing. More specifically, the transfer functions Gt2_i2 and others are calculated by inputting the above-described frequency responses i2d2 and others to the following Equations (6-1) to (6-4) derived on the basis of the above Equations (1) to (3). Gt2_i2 in the following Equation (6-1) represents a transfer function from the second torque current command signal i2 to the second shaft torque detection signal t2, Gt2_i3 in the following Equation (6-2) represents a transfer function from the third torque current command signal i3 to the second shaft torque detection signal t2, Gt3_i2 in the following Equation (6-3) represents a transfer function from the second torque current command, signal i2 to the third shaft torque detection signal t3, and Gt3_i3.in the following Equation (6-4) represents a transfer function from the third torque current command signal i3 to the third. shaft torque detection signal t3.

$$Gt2\_i2 = \frac{-i3d3 \cdot t2d2 + i3d2 \cdot t2d3}{i2d3 \cdot i3d2 - i2d2 \cdot i3d3} \quad (6\text{-}1)$$

$$Gt2\_i3 = \frac{i2d3 \cdot t2d2 - i2d2 \cdot t2d3}{i2d3 \cdot i3d2 - i2d2 \cdot i3d3} \quad (6\text{-}2)$$

$$Gt3\_i2 = \frac{-i3d3 \cdot t3d2 + i3d2 \cdot t3d3}{i2d3 \cdot i3d2 - i2d2 \cdot i3d3} \quad (6\text{-}3)$$

$$Gt3\_i3 = \frac{i2d3 \cdot t3d2 - i2d2 \cdot t3d3}{i2d3 \cdot i3d2 - i2d2 \cdot i3d3} \quad (6\text{-}4)$$

In S12, the estimation device calculates four transfer functions Gw2_i2, Gw2_i3, Gw3_i2, and Gw3_i3 by using the eight pairs of frequency responses i2d2, w2d2, i2d3, w2d3, i3d2, w3d2, i3d3, and w3d3 measured by the processing described above. More specifically, the transfer functions Gw2_i2 and others are calculated by inputting the above-described frequency responses i2d2 and others to the following Equations (7-1) to (7-4) derived on the basis of the above Equations (1) to (3). Gw2_i2 in the following Equation (7-1) represents a transfer function from the second torque current command signal i2 to the second speed detection signal w2, Gw2_i3 in the following Equation (7-2) represents a transfer function from the third torque current command signal i3 to the second speed detection signal w2, Gw3_i2 in the following Equation (7-3) represents a transfer function from the second torque current command signal i2 to the third speed detection signal w3, and Gw3_i3 in the following Equation (7-4) represents a transfer function from the third torque current command signal i3 to the third speed detection signal w3.

$$Gw2\_i2 = \frac{-i3d3 \cdot w2d2 + i3d2 \cdot w2d3}{i2d3 \cdot i3d2 - i2d2 \cdot i3d3} \quad (7\text{-}1)$$

$$Gw2\_i3 = \frac{i2d3 \cdot w2d2 - i2d2 \cdot w2d3}{i2d3 \cdot i3d2 - i2d2 \cdot i3d3} \quad (7\text{-}2)$$

$$Gw3\_i2 = \frac{-i3d3 \cdot w3d2 + i3d2 \cdot w3d3}{i2d3 \cdot i3d2 - i2d2 \cdot i3d3} \quad (7\text{-}3)$$

$$Gw3\_i3 = \frac{i2d3 \cdot w3d2 - i2d2 \cdot w3d3}{i2d3 \cdot i3d2 - i2d2 \cdot i3d3} \quad (7\text{-}4)$$

Figure 4A:
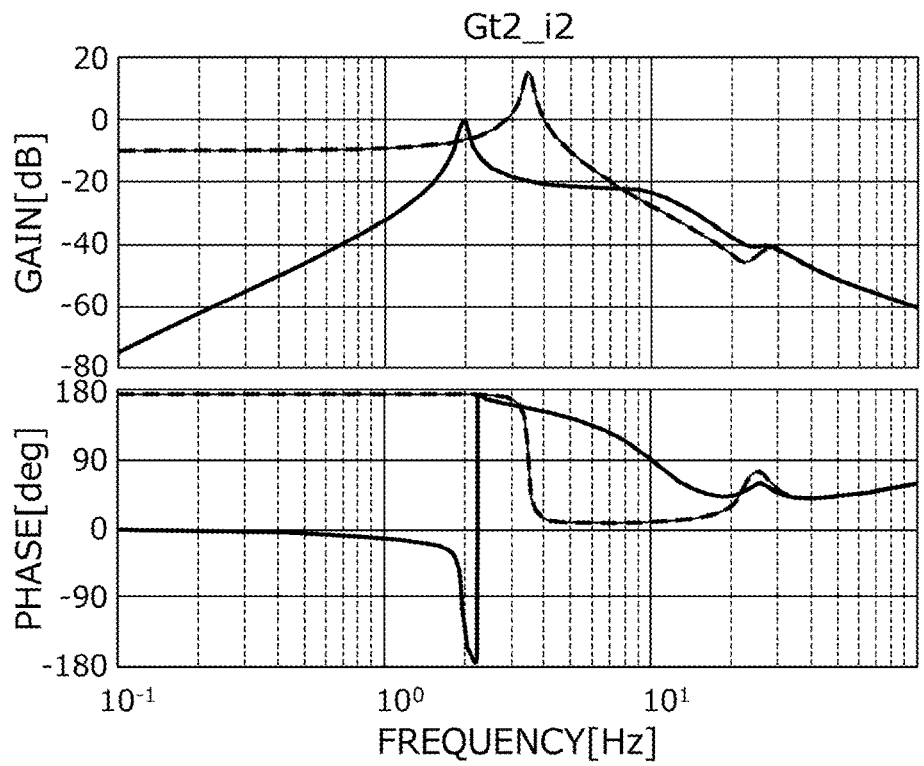
FIG. 4A is a graph illustrating an estimation result (Gt2_i2) in Example 1.
Figure 4B:
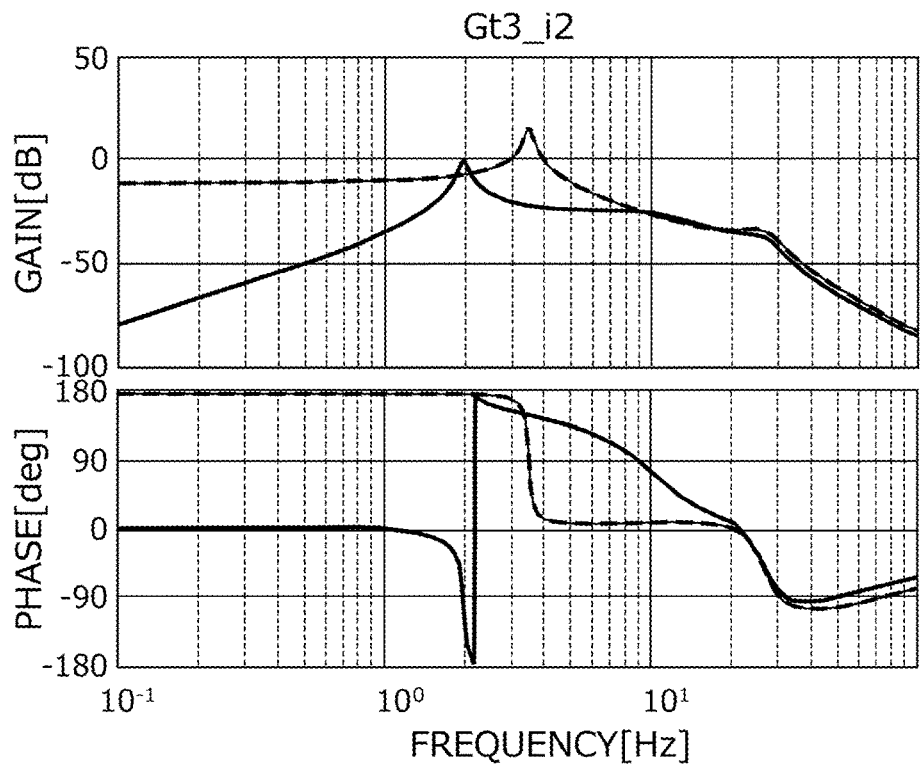
FIG. 4B is a graph illustrating an estimation result (Gt3_i2) in Example 1.
Figure 4C:
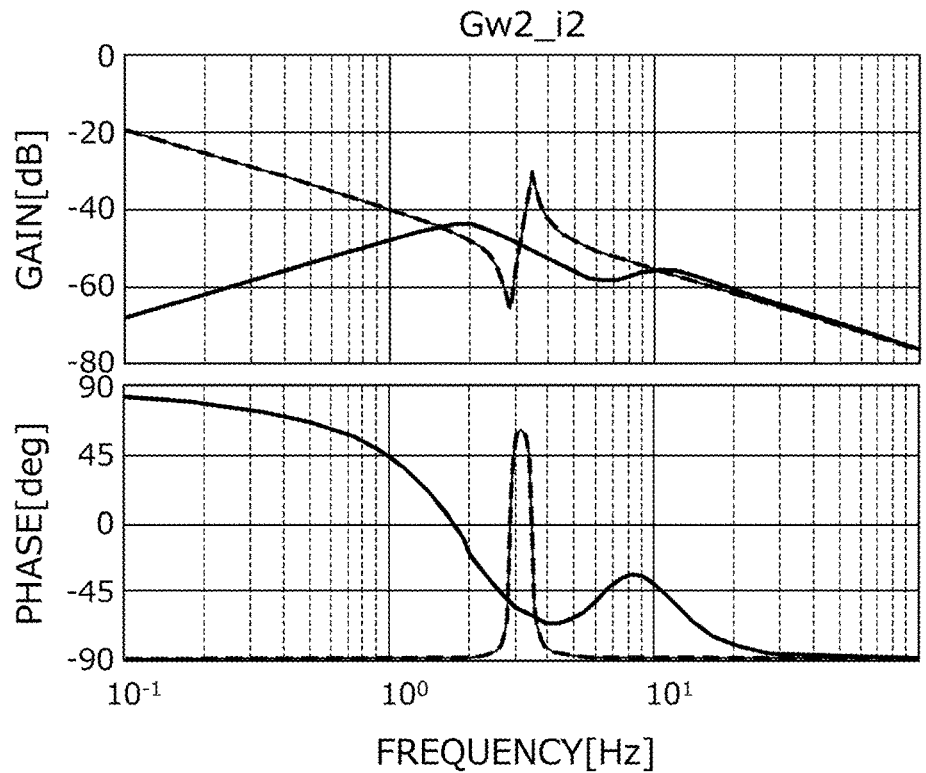
FIG. 4C is a graph illustrating an estimation result (Gw2_i2) in Example 1.
Figure 4D:
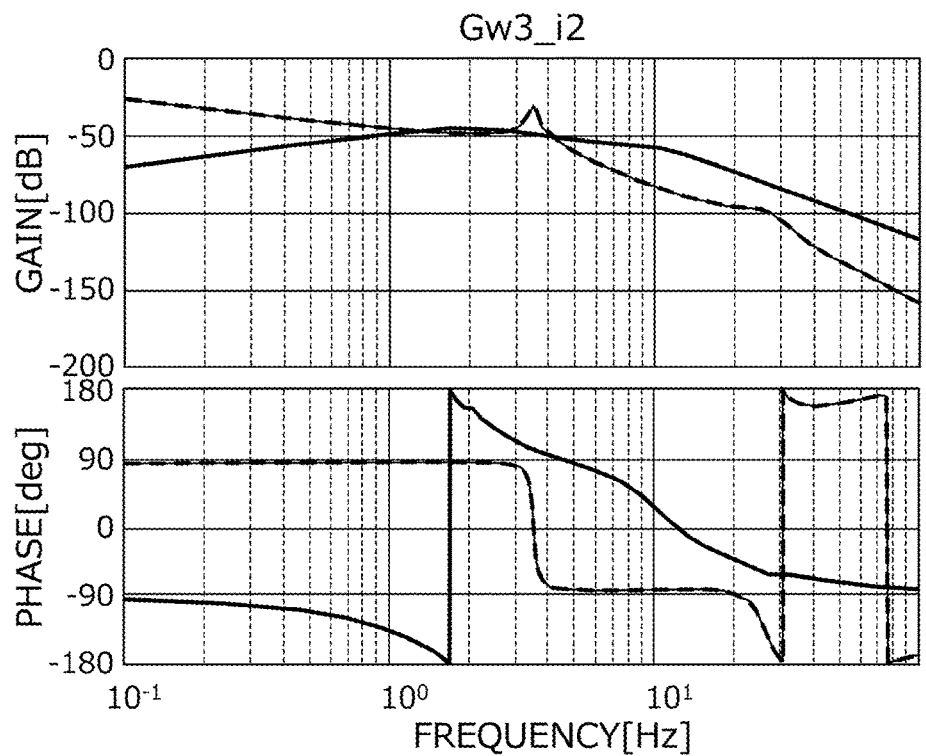
FIG. 4D is a graph illustrating an estimation result (Gw3_i2) in Example 1.
Figure 4E:
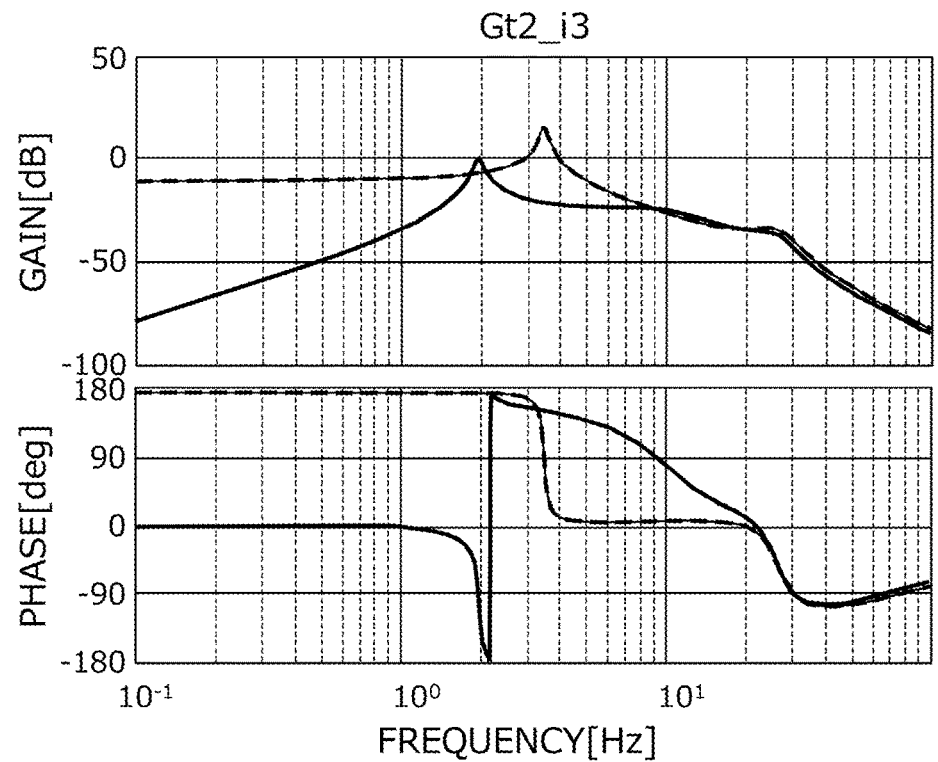
FIG. 4E is a graph illustrating an estimation result (Gt2_i3) in Example 1.
Figure 4F:
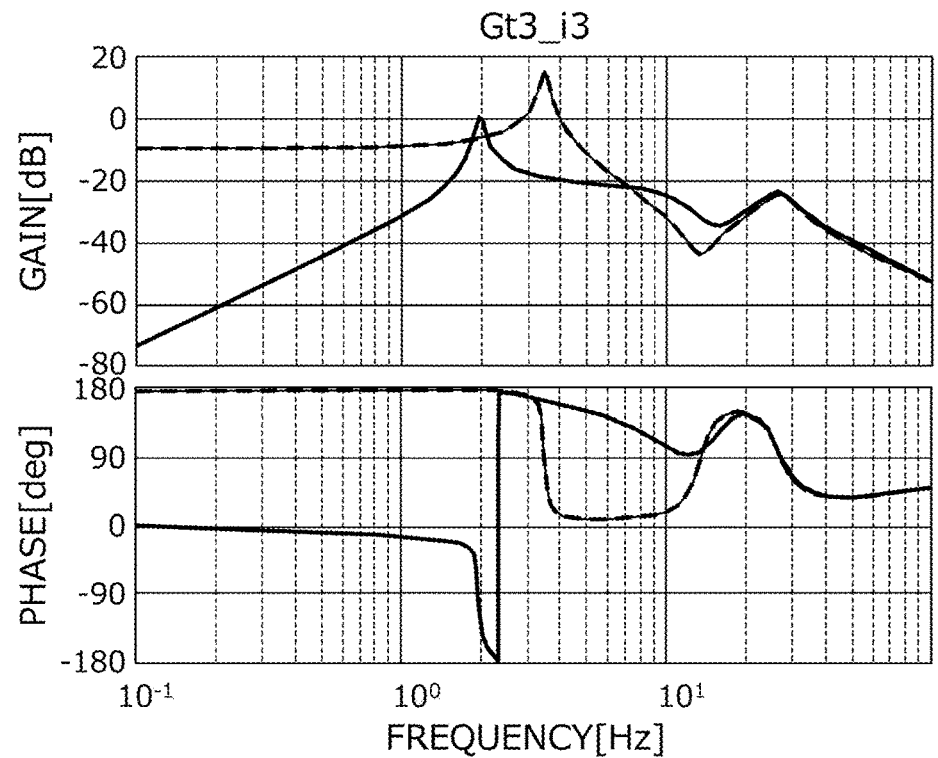
FIG. 4F is a graph illustrating an estimation result (Gt3_i3) in Example 1.
Figure 4G:
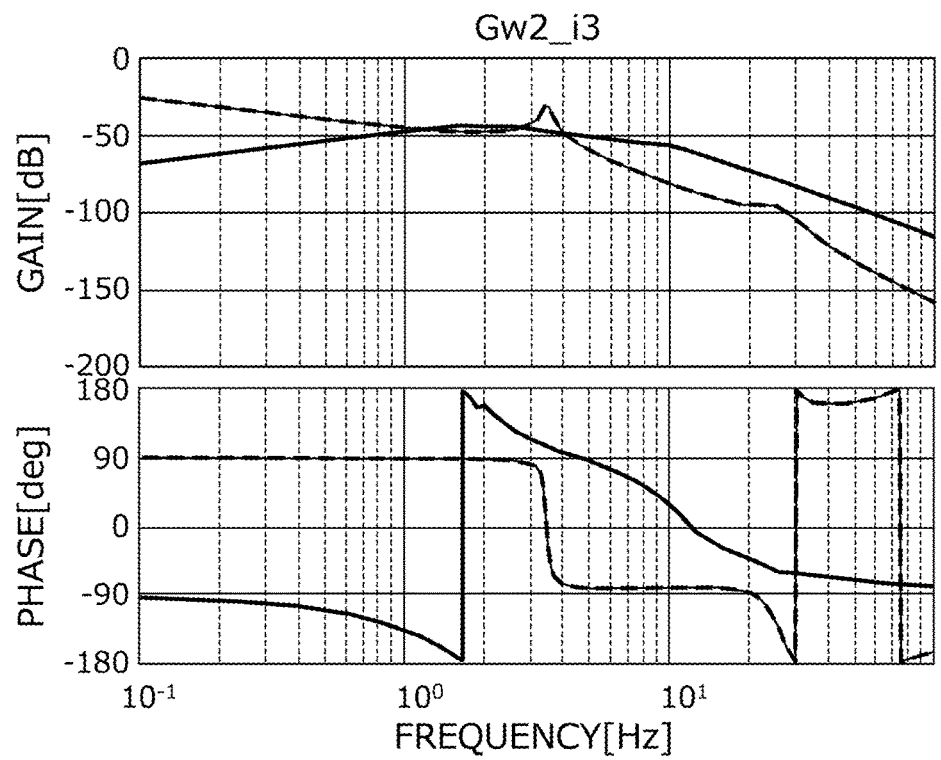
FIG. 4G is a graph illustrating an estimation result (Gw2_i3) in Example 1.
Figure 4H:
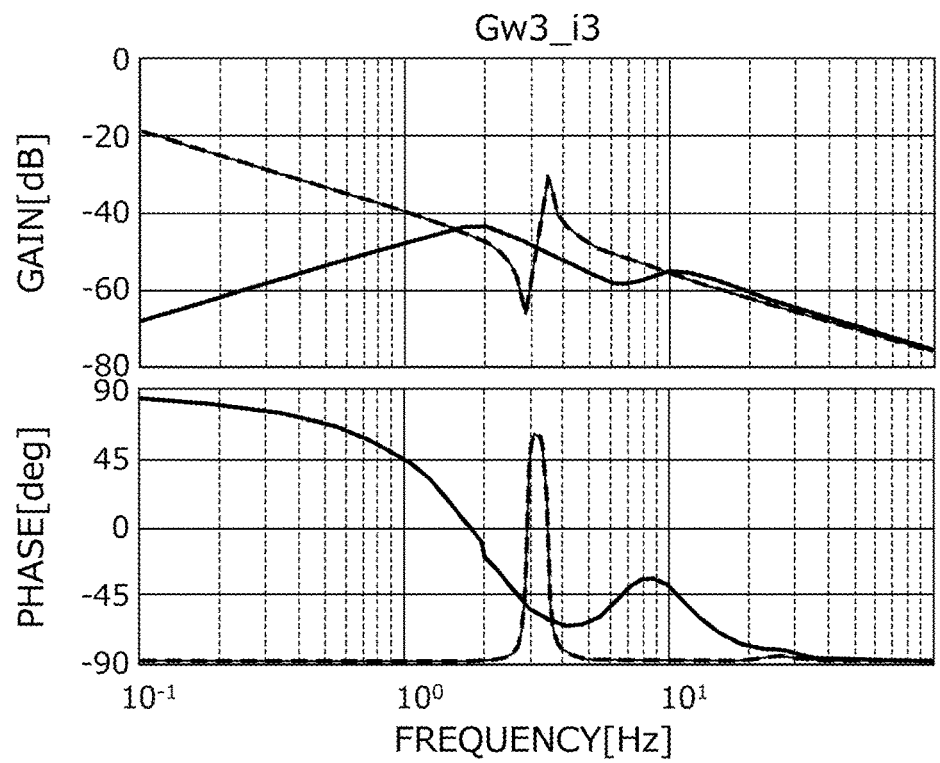
FIG. 4H is a graph illustrating an estimation result (Gw3_i3) in Example 1.

FIGS. 4A to 4H are graphs each illustrating an estimation result by the estimation device in Example 1. More specifically, FIG. 4A illustrates a Bode diagram of the transfer function Gt2_i2 estimated by Equation (6-1), FIG. 4B illustrates a Bode diagram of the transfer function Gt3_i2 estimated by Equation (6-3), FIG. 4C illustrates a Bode diagram of the transfer function Gw2_i2 estimated by Equation (7-1), FIG. 4D illustrates a Bode diagram of the transfer function Gw3_i2 estimated by Equation (7-3), FIG. 4E illustrates a Bode diagram of the transfer function Gt2_i3 estimated by Equation (6-2), FIG. 4F illustrates a Bode diagram of the transfer function Gt3_i3 estimated by Equation (6-4), FIG. 4G illustrates a Bode diagram of the transfer function Gw2_i3 estimated by Equation (7-2), and FIG. 4H illustrates a Bode diagram of the transfer function Gw2_i3 estimated by Equation (7-4). Further, in each of the diagrams, a thin full line indicates a true mechanical characteristic, and a broken line indicates an estimation result by the input/output characteristic estimation method in Example 1.

Moreover, each thick solid line in each of the diagrams indicates an estimation result by a conventional input/output characteristic estimation method. Here, the conventional input/output characteristic estimation method refers to a method which simply measures a response to an excitation torque input. More specifically, the thick solid line in FIG. 4A is a response (i.e., t2d2 in Equation (4-2)) of the shaft torque detection signal t2 when the second excitation torque input d2 is input to the second dynamometer, the thick solid line in FIG. 4B is a response (i.e., t3d2 in Equation (4-5)) of the third shaft torque detection signal t3 when the excitation torque input d2 is input to the second dynamometer, the thick solid line in FIG. 4C is a response (i.e., w2d2 in Equation (4-3)) of the second speed detection signal w2 when the second excitation torque input d2 is input to the second dynamometer, the thick solid line in FIG. 4D is a response (i.e., w3d2 in Equation (4-6)) of the third speed detection signal w3 when the second excitation torque input d2 is input to the second dynamometer, the thick solid line in FIG. 4E is a response (i.e., t2d3 in Equation (5-2)) of the shaft torque detection signal t2 when the excitation torque input d3 is input to the third dynamometer, the thick solid line in FIG. 4F is a response (i.e., t3d3 in Equation (5-5)) of the third shaft torque detection signal t3 when the excitation torque input d3 is input to the third dynamometer, the thick solid line in FIG. 4G is a response (i.e., w2d3 in Equation (5-3)) of the second speed detection signal w2 when the excitation torque input d3 is input to the third dynamometer, and the thick solid line in FIG. 4H is a response (i.e., w3d3 in Equation (5-6)) of the third speed detection signal w3 when the excitation torque input d3 is input to the third dynamometer.

As illustrated in FIGS. 4A to 4H, a true mechanical characteristic cannot be obtained by merely measuring a response to an excitation torque input with regard to a mechanical characteristic to be obtained, as in the conventional input/output characteristic estimation method. This is because a test piece includes a plurality of shafts, and each shaft is controlled by the speed control device and subjected to a characteristic of this speed control device In contrast, the input/output characteristic estimation device in Example 1 estimates one transfer function by combining a plurality of responses obtained when a plurality of dynamometers connected to a test piece are excitation-controlled, and can thereby estimate an input/output characteristic of a testing system with accuracy while removing a characteristic of the speed control device, as illustrated in FIGS. 4A to 4H.

In addition, in the processing in FIG. 3, it is not necessary, in estimating each transfer function, to measure a response when the first excitation torque input d1 is input to the first dynamometer. Thus, in performing the input/output characteristic estimation method in Example 1, an actual engine may be connected to the first shaft S1 of the test piece W, without connecting the first dynamometer 21 thereto.

Example 2

Next, an input/output characteristic estimation method for a testing system in Example 2 is described. The input/output characteristic estimation method in Example 2 estimates transfer functions from two input signals (the second speed detection signal w2 or the third speed detection signal w3) to the second torque current command signal i2 or the third torque current command signal i3 in the speed control device 73 in FIG. 2 (i.e., in the transfer function matrix C in Equation (3), four transfer functions including the component C22 in the second column and second row, the component C23 in the third column and second row, the component C32 in the second column and third row, and the component C33 in the third column and third row.

Figure 5:
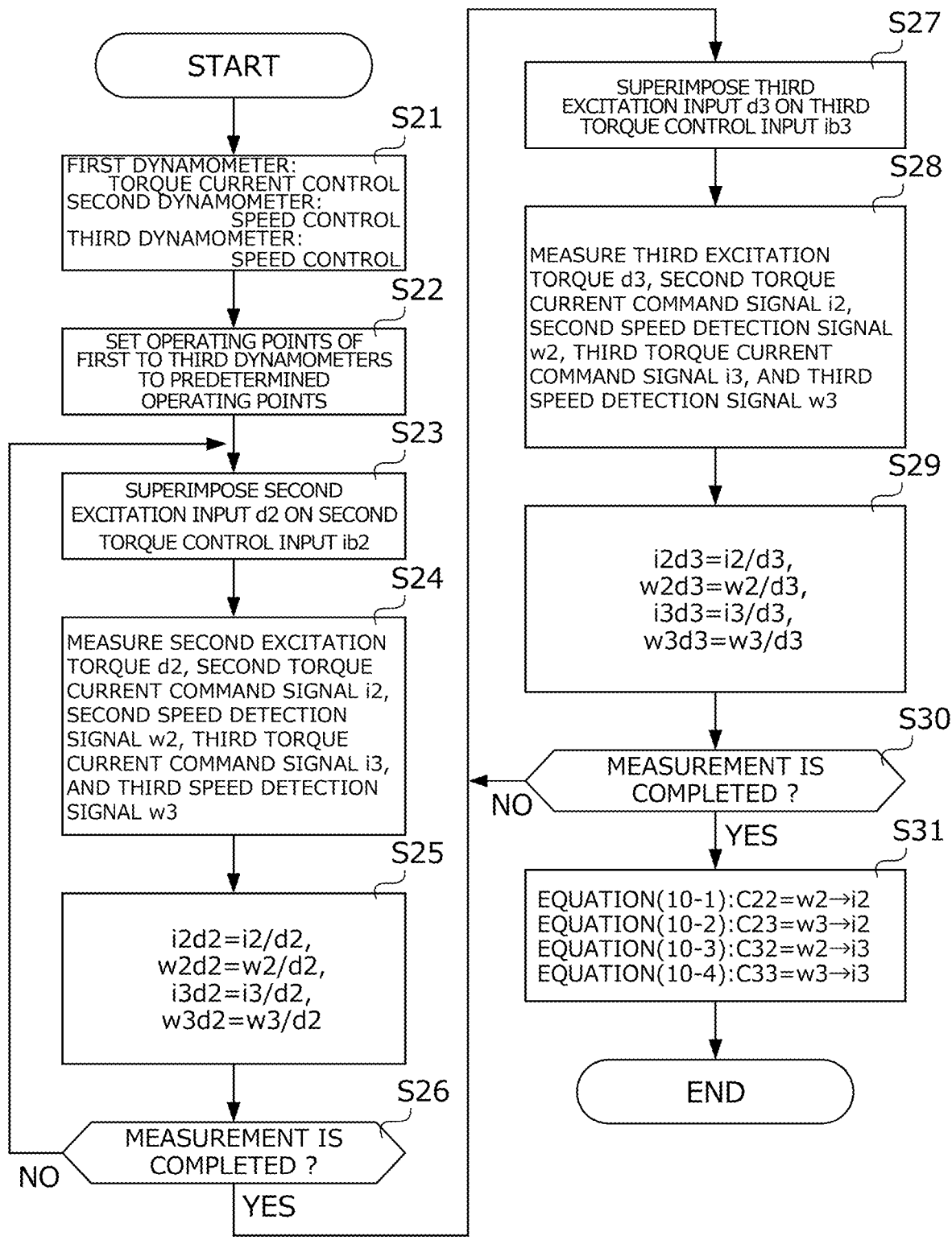
FIG. 5 is a flowchart illustrating a specific calculation procedure of an input/output characteristic estimation method in Example 2.

FIG. 5 is a flowchart illustrating a specific calculation procedure for estimating an input/output characteristic by the input/output characteristic estimation method in Example 2. In S21, control of the first to third dynamometers using the dynamometer control device in FIG. 2 is started, as in S1 of FIG. 3. In S22, the dynamometer control device sets operating points of the first to third dynamometers to operating points predetermined for measurement of an input/output characteristic, as in S2 of FIG. 3. In S23, the dynamometer control device generates the second excitation torque input d2, superimposes the second excitation torque input d2 on the second torque control input ib2, and vibrates the second torque current command signal i2, as in S3 of FIG. 3.

In S24, the estimation device measures the second excitation torque input d2, the second torque current command signal i2, the second speed detection signal w2, the third torque current command signal i3, and the third speed detection signal w3.

In S25, the estimation device measures four frequency responses i2d2, w2d2, i3d2, and w3d2 as indicated in the following Equations (8-1) to (8-4), by calculating ratios between the second excitation torque input d2 measured in S24 and the other output signals i2, w2, i3, and w3.

$$i2d2 = i2/d2 \quad (8\text{-}1)$$

$$w2d2 = w2/d2 \quad (8\text{-}2)$$

$$i3d2 = i3/d2 \quad (8\text{-}3)$$

$$w3d2 = w3/d2 \quad (8\text{-}4)$$

In S26, the estimation device determines whether or not measurement of the four frequency responses i2d2 and others is completed within a predetermined frequency region. When the determination in S26 is NO, the estimation device returns to S23, changes the excitation frequency of the second excitation torque input d2, and then again executes the processing of S24 and S25. When the determination in S26 is YES, the estimation device shifts to S27. In S27, the dynamometer control device generates the third excitation torque input d3, superimposes the third excitation torque input d3 on the third torque control input ib3, and vibrates the third torque current command signal i3, as in S7 of FIG. 3.

In S28, the estimation device measures the third excitation torque input d3, the second torque current command signal i2, the second speed detection signal w2, the third torque current command signal i3, and the third speed detection signal w3.

In S29, the estimation device measures four frequency responses i2d2, w2d3, i3d3, and w3d3 as indicated in the following Equations (9-1) to (9-4), by calculating ratios between the third excitation torque input d3 measured in S28 and the other output signals i2, w2, i3, and w3.

$$i2d3 = i2/d3 \quad (9\text{-}1)$$

$$w2d3 = w2/d3 \quad (9\text{-}2)$$

$$i3d3 = i3/d3 \quad (9\text{-}3)$$

$$w3d3 = w3/d3 \quad (9\text{-}4)$$

In S30, the estimation device determines whether or not measurement of the four frequency responses i2d3 and others is completed within a predetermined frequency region. When the determination in S30 is NO, the estimation device returns to S37, changes the excitation frequency of the third excitation torque input d3, and then again executes the processing of S28 and S29. When the determination in S30 is YES, the estimation device shifts to S31.

In S31, the estimation device calculates four transfer functions C22, C23, C32, and C33 by using the eight pairs of frequency responses i2d2, w2d2, i3d2, w3d2, i2d3, w2d3, i3d3, and w3d3 measured by the processing described above. More specifically, the transfer functions C22 and others are calculated by inputting the above-described frequency responses i2d2 and others to the following Equations (10-1) to (10-4) derived on the basis of the above Equations (1) to (3). C22 in the following Equation (10-1) represents a transfer function from the second speed detection signal w2 to the second torque current command signal i2 (or the second torque control input ib2), C23 in the following Equation (10-2) represents a transfer function from the third speed detection signal w3 to the second torque current command signal i2 (or the second torque control input ib2), C32 in the following Equation (10-3) represents a transfer function from the second speed detection signal w2 to the third torque current command signal i3 (or the third torque control input ib3), and C33 in the following Equation (10-4) represents a transfer function from the third speed detection signal w3 to the third torque current command signal i3 (or the third torque control input ib3).

$$C22 = \frac{w3d3 + i2d3 \cdot w3d2 - i2d2 \cdot w3d3}{w2d3 \cdot w3d2 - w2d2 \cdot w3d3} \quad (10\text{-}1)$$

$$C23 = \frac{w2d3 + i2d3 \cdot w2d2 - i2d2 \cdot w2d3}{-w2d3 \cdot w3d2 + w2d2 \cdot w3d3} \quad (10\text{-}2)$$

$$C32 = \frac{-w3d2 + i3d3 \cdot w3d2 - i3d2 \cdot w3d3}{w2d3 \cdot w3d2 - w2d2 \cdot w3d3} \quad (10\text{-}3)$$

$$C33 = \frac{i - w2d2 + i3d3 \cdot w2d2 - i3d2 \cdot w2d3}{-w2d3 \cdot w3d2 + w2d2 \cdot w3d3} \quad (10\text{-}4)$$

In addition, in the processing in FIG. 5, it is not necessary, in estimating each transfer function, to measure a response when the first excitation torque input d1 is input to the first dynamometer. Thus, in performing the input/output characteristic estimation method in Example 2, an actual engine may be connected to the first shaft S1 of the test piece W, without connecting the first dynamometer 21 thereto, as in Example 1.

According to the input/output characteristic estimation method in Example 2 as above, frequency responses (i2d2, w2d2, and others) to the excitation torque input d2 when the second dynamometer is excitation-controlled by the excitation torque input d2 are measured in the processing of S23 to S25, and frequency responses (i2d3, w2d3, and others) to the excitation torque input d3 when the third dynamometer is excitation-controlled by the excitation torque input d3 are measured in the processing of S27 to S29. Further, in the processing of S31, a transfer function from the input signal (w2 or w3) to the output signal (i2 or i3) in the speed control device which controls speeds of the second and third dynamometers is estimated by using a plurality of frequency responses measured in the excitation control. In this way, in the input/output characteristic estimation method in Example 2, a transfer function representing an input/output characteristic of a speed control device is estimated by combining the frequency response when the second dynamometer is excitation-controlled by the input d2 with the frequency response when the third dynamometer different from the second dynamometer is excitation-controlled by the input d3. Thereby, it is possible to estimate the transfer function with accuracy in a state where the speed control device is actually operated. In addition, an actual speed control device is configured by combining various control circuits. Thus, it may be difficult to operate only a particular control circuit and then estimate an input/output characteristic thereof, or it may take time. In the input/output characteristic estimation method in Example 2, an input/output characteristic of a speed control device can be estimated in a state where the, speed control device is actually operated. Therefore, the input/output characteristic can be estimated with ease and in a short time.

Example 3

Next, an input/output characteristic estimation method for a testing system in Example 3 is described. In the input/output characteristic estimation method in-Example 3, all the transfer functions indicated in the., above Equations (1) to (3) are estimated.

Figure 6A:
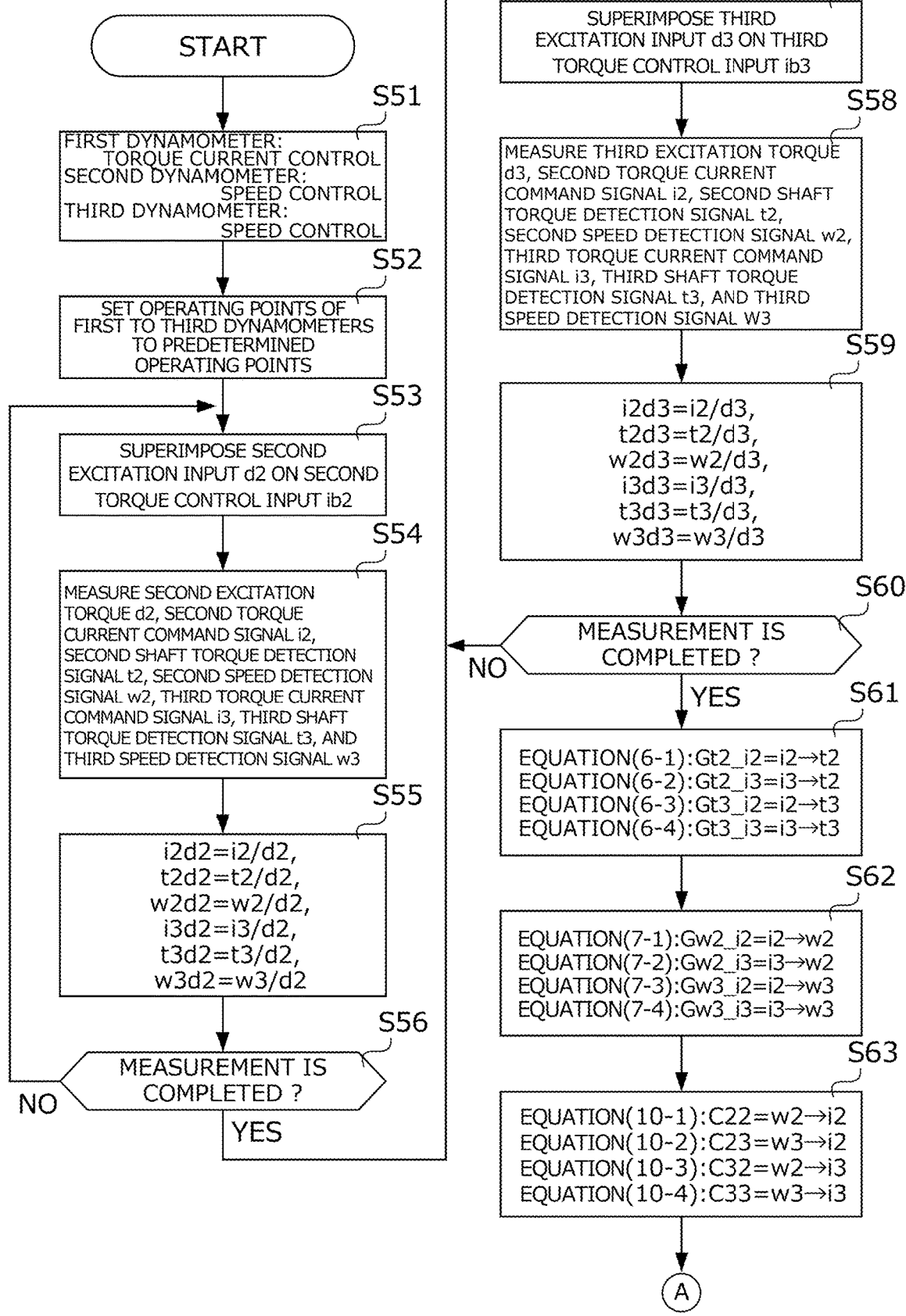
FIG. 6A is a flowchart, illustrating a specific calculation procedure of an input/output characteristic estimation method in Example 3.
Figure 6B:
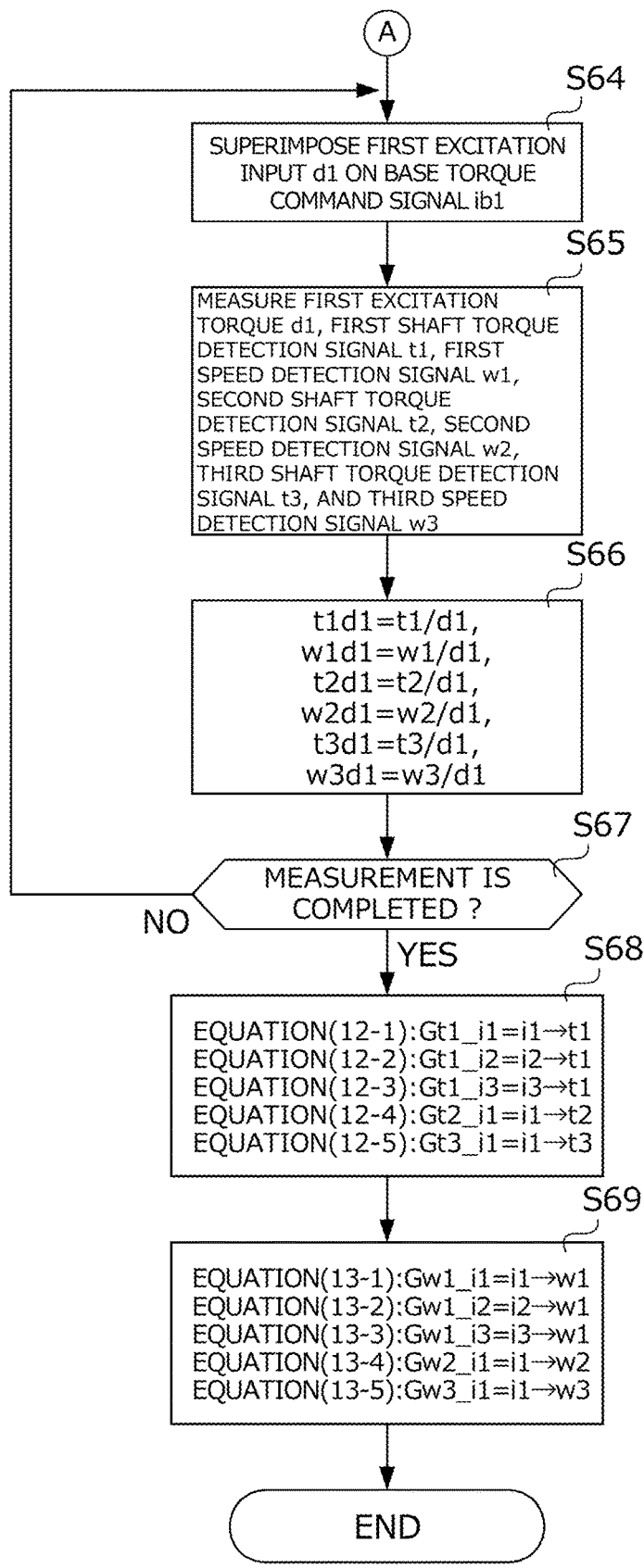
FIG. 6B is a flowchart illustrating a specific calculation procedure of an input/output characteristic estimation method in Example 3.

FIGS. 6A to 6B are flowcharts illustrating a specific calculation procedure for estimating an input/output characteristic by the input/output characteristic estimation method in Example 3. In addition, processing of S51 to S62 is the same as the processing of S1 to S12 in FIG. 3, and processing of S63 is the same as the processing of S31 in FIG. 5. Therefore, a detailed description thereof is omitted.

In S64, while maintaining the base torque command signal, the average speed command signal, and the difference speed command signal at the operating points in S52, the dynamometer control device generates the first excitation torque input d1 varying at a predetermined excitation frequency, superimposes the first excitation torque input d1 on the base torque command signal ib1, and vibrates the first torque current command signal i1. In addition, in this instance, each of the other excitation torque inputs d2 and d3 is assumed to be 0.

In S65, the estimation device measures the first excitation torque input d1, the first shaft torque detection signal t1, the first speed detection signal w1, the second shaft torque detection signal t2, the second speed detection signal w2, the third shaft torque detection signal t3, and the third speed detection signal w3.

In S66, the estimation device measures six frequency responses t1d1, w1d1, t2d1, w2d1, t3d1, and w3d1 as indicated in the following Equations (11-1) to (11-6), by calculating ratios between the first excitation torque input d1 measured in S65 and the other output signals t1, w1, t2, w2, t3, and w3. Here, t1d1 represents a frequency response of the first shaft torque detection signal t1 to the first excitation torque input d1 input to the first dynamometer 21, w1d1 represents a frequency response of the first speed detection signal w1 to the input d1, t2d1 represents a frequency response of the second shaft torque detection signal t2 to the input d1, w2d1 represents a frequency response of the second speed detection signal w2 to the input d1, t3d1 represents a frequency response of the third shaft torque detection signal t3 to the input d1, and w3d1 represents a frequency response of the third speed detection signal w3 to the input d1.

$$t1d1 = t1/d1 \quad (11\text{-}1)$$

$$w1d1 = w1/d1 \quad (11\text{-}2)$$

$$t2d1 = t2/d1 \quad (11\text{-}3)$$

$$w2d1 = w2/d1 \quad (11\text{-}4)$$

$$t3d1 = t3/d1 \quad (11\text{-}5)$$

$$w3d1 = w3/d1 \quad (11\text{-}6)$$

In S67, the estimation device determines whether or not measurement of the six frequency responses t1d1 and others is completed within a predetermined frequency region. When the determination in S67 is NO, the estimation device returns to S64, changes the excitation frequency of the first excitation torque input d1, and then again executes the processing of S65 and S66. When the determination in S67 is YES, the estimation device shifts to S68.

In S68, the estimation device calculates five pairs of transfer functions Gt1_i1, Gt1_i2, Gt1_i3, Gt2_i1, and Gt3_i1 by using the six pairs of frequency responses t1d1, w1d1, t2d1, w2d1, t3d1, and w3d1 measured in S66, and twelve pairs of transfer functions (see S61 to 63) calculated on the basis of the frequency responses measured by excitation control (see S53 to 55) for the second dynamometer and excitation control (see S57 to 59) for the third dynamometer. More. specifically, Gt1_i1 and others are calculated by inputting, to the following Equations (12-1) to (12-5) derived on the basis of the above Equations (1) to (3), the frequency responses t1d1 and others to the first excitation torque input d1 measured in S66, the frequency responses t1d2 and others to the excitation torque inputs d2 and d3 measured in S55 and S59, and the transfer functions Gw2_i2, C22, and others calculated in S61 to S63 on the basis of the frequency responses t1d2 and others.

$$\begin{aligned}Gt1\_i1 = {}& t1d1 - C22 \cdot t1d2 \cdot w2d1 + \\ & C22^2 \cdot Gw2\_i2 \cdot t1d2 \cdot w2d1 + \\ & C22 \cdot C32 \cdot Gw2\_i3 \cdot t1d2 \cdot w2d1 + \\ & C22 \cdot C23 \cdot Gw3\_i2 \cdot t1d2 \cdot w2d1 + \\ & C23 \cdot C32 \cdot Gw3\_i3 \cdot t1d2 \cdot w2d1 - C32 \cdot t1d3 \cdot w2d1 + \\ & C22 \cdot C32 \cdot Gw2\_i2 \cdot t1d3 \cdot w2d1 + \\ & C32^2 \cdot Gw2\_i3 \cdot t1d3 \cdot w2d1 + \\ & C22 \cdot C33 \cdot Gw3\_i2 \cdot t1d3 \cdot w2d1 + \\ & C32 \cdot C33 \cdot Gw3\_i3 \cdot t1d3 \cdot w2d1 - C23 \cdot t1d2 \cdot w3d1 + \\ & C22 \cdot C23 \cdot Gw2\_i2 \cdot t1d2 \cdot w3d1 + \\ & C22 \cdot C33 \cdot Gw2\_i3 \cdot t1d2 \cdot w3d1 + \\ & C23^2 \cdot Gw3\_i2 \cdot t1d2 \cdot w3d1 + \\ & C23 \cdot C33 \cdot Gw3\_i3 \cdot t1d2 \cdot w3d1 - C33 \cdot t1d3 \cdot w3d1 + \\ & C23 \cdot C32 \cdot Gw2\_i2 \cdot t1d3 \cdot w3d1 + \\ & C32 \cdot C33 \cdot Gw2\_i3 \cdot t1d3 \cdot w3d1 + \\ & C23 \cdot C33 \cdot Gw3\_i2 \cdot t1d3 \cdot w3d1 + \\ & C33^2 \cdot Gw3\_i3 \cdot t1d3 \cdot w3d1 \end{aligned} \quad (12\text{-}1)$$

$$\begin{aligned}Gt1\_i2 = {}& t1d2 - C22 \cdot Gw2\_i2 \cdot t1d2 - C23 \cdot Gw3\_i2 \cdot t1d2 - \\ & C32 \cdot Gw2\_i2 \cdot t1d3 - C33 \cdot Gw3\_i2 \cdot t1d3 \end{aligned} \quad (12\text{-}2)$$

$$\begin{aligned}Gt1\_i3 = {}& t1d3 - C22 \cdot Gw2\_i3 \cdot t1d2 - C23 \cdot Gw3\_i3 \cdot t1d2 - \\ & C32 \cdot Gw2\_i3 \cdot t1d3 - C33 \cdot Gw3\_i3 \cdot t1d3 \end{aligned} \quad (12\text{-}3)$$

$$\begin{aligned}Gt2\_i1 = {}& t2d1 - C22 \cdot Gt2\_i2 \cdot w2d1 - C32 \cdot Gt2\_i3 \cdot w2d1 - \\ & C23 \cdot Gt2\_i2 \cdot w3d1 - C33 \cdot Gt2\_i3 \cdot w3d1 \end{aligned} \quad (12\text{-}4)$$

$$Gt3\_i1=t3d1-C22 \cdot Gt3\_i2 \cdot w2d1-C32 \cdot Gt3\_i3 \cdot w2d1- \\ C23 \cdot Gt3\_i2 \cdot w3d1-C33 \cdot Gt3\_i3 \cdot w3d1 \quad (12\text{-}5)$$

In S69, the estimation device calculates five pairs of transfer functions Gw1_i1, Gw1_i2, Gw1_i3, Gw2_i1, and Gw3_i1 by using the six pairs of frequency responses t1d1, w1d1, t2d1, w2d1, t3d1, and w3d1 measured in S66, and twelve pairs of transfer functions (see S61 to 63) calculated on the basis of the frequency responses measured by excitation control (see S53 to 55) for the second dynamometer and excitation control (see S57 to 59) for the third dynamometer, and finishes this processing. More specifically, the transfer functions Gw1_i1 and others are calculated by inputting, to the following Equations (13-1) to (13-5) derived on the basis of the above Equations (1) to (3), the frequency responses t1d1 and others to the first excitation torque input d1 measured in S66, the frequency responses t1d2 and others to the excitation torque inputs d2 and d3 measured in S55 and S59, and the transfer functions Gw2_i2, C22, and others calculated in S61 to S63 on the basis of the frequency responses t1d2 and others.

$$\begin{aligned}Gw1\_i1 = &\, w1d1-C22 \cdot w1d2 \cdot w2d1+ \\ &C22^2 \cdot Gw2\_i2 \cdot w1d2 \cdot w2d1+ \\ &C22 \cdot C32 \cdot Gw2\_i3 \cdot w1d2 \cdot w2d1+ \\ &C22 \cdot C23 \cdot Gw3\_i2 \cdot w1d2 \cdot w2d1+ \\ &C23 \cdot C32 \cdot Gw3\_i3 \cdot w1d2 \cdot w2d1-C32 \cdot w1d3 \cdot w2d1+ \\ &C22 \cdot C32 \cdot Gw2\_i2 \cdot w1d3 \cdot w2d1+ \\ &C32^2 \cdot Gw2\_i3 \cdot w1d3 \cdot w2d1+ \\ &C22 \cdot C33 \cdot Gw2\_i3 \cdot w1d3 \cdot w2d1+ \\ &C32 \cdot C33 \cdot Gw3\_i3 \cdot w1d3 \cdot w2d1-C23 \cdot w1d2 \cdot w3d1+ \\ &C22 \cdot C23 \cdot Gw2\_i2 \cdot w1d2 \cdot w3d1+ \\ &C22 \cdot C33 \cdot Gw2\_i3 \cdot w1d2 \cdot w3d1+ \\ &C23^2 \cdot Gw3\_i2 \cdot w1d2 \cdot w3d1+ \\ &C23 \cdot C33 \cdot Gw3\_i3 \cdot w1d2 \cdot w3d1-C33 \cdot w1d3 \cdot w3d1+ \\ &C23 \cdot C32 \cdot Gw2\_i2 \cdot w1d3 \cdot w3d1+ \\ &C32 \cdot C33 \cdot Gw2\_i3 \cdot w1d3 \cdot w3d1+ \\ &C23 \cdot C33 \cdot Gw3\_i2 \cdot w1d3 \cdot w3d1+ \\ &C33^2 \cdot Gw3\_i3 \cdot w1d3 \cdot w3d1 \quad (13\text{-}1)\end{aligned}$$

$$\begin{aligned}Gw1\_i2 = &\, w1d2-C22 \cdot Gw2\_i2 \cdot w1d2- \\ &C23 \cdot Gw3\_i2 \cdot w1d2-C32 \cdot Gw2\_i2 \cdot w1d3- \\ &C33 \cdot Gw3\_i2 \cdot w1d3 \quad (13\text{-}2)\end{aligned}$$

$$\begin{aligned}Gw1\_i3 = &\, w1d3-C22 \cdot Gw2\_i3 \cdot w1d2- \\ &C23 \cdot Gw3\_i3 \cdot w1d2-C32 \cdot Gw2\_i3 \cdot w1d3- \\ &C33 \cdot Gw3\_i3 \cdot w1d3 \quad (13\text{-}3)\end{aligned}$$

$$\begin{aligned}Gw2\_i1 = &\, w2d1-C22 \cdot Gw2\_i2 \cdot w2d1- \\ &C32 \cdot Gw2\_i3 \cdot w2d1-C23 \cdot Gw2\_i2 \cdot w3d1- \\ &C33 \cdot Gw2\_i3 \cdot w3d1 \quad (13\text{-}4)\end{aligned}$$

$$\begin{aligned}Gw3\_i1 = &\, w3d1-C22 \cdot Gw3\_i2 \cdot w2d1- \\ &C32 \cdot Gw3\_i3 \cdot w2d1-C23 \cdot Gw3\_i2 \cdot w3d1- \\ &C33 \cdot Gw3\_i3 \cdot w3d1 \quad (13\text{-}5)\end{aligned}$$

FIGS. 7A to 7J are graphs each illustrating an estimation result by the input/output characteristic estimation method in Example 3

Figure 7A:
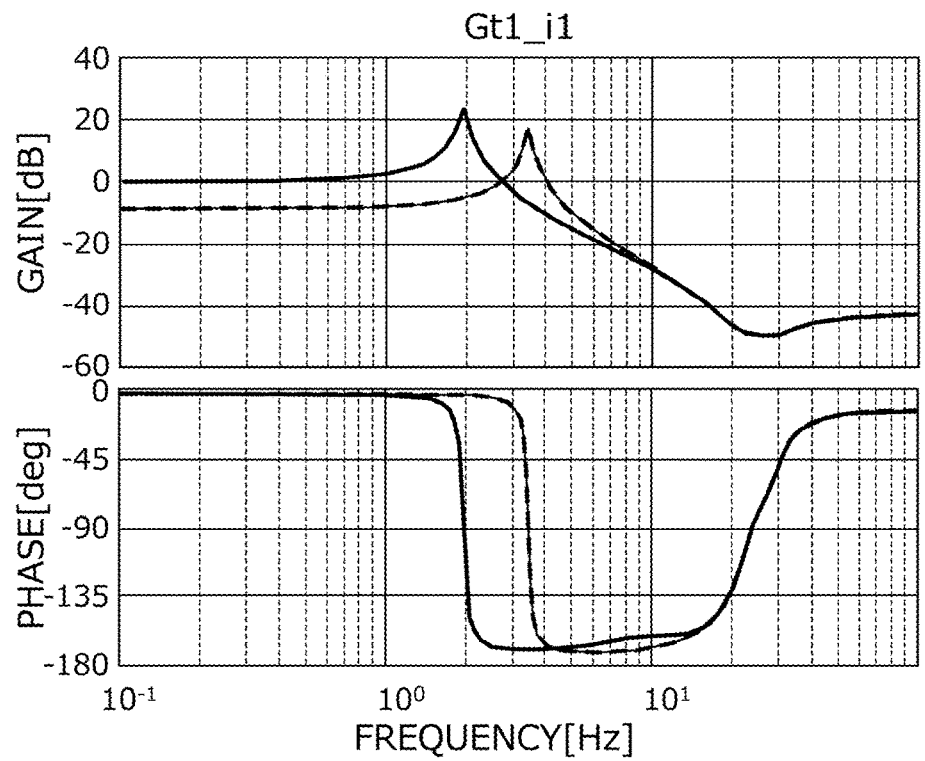
FIG. 7A is a graph illustrating an estimation result (Gt1_i1) in Example 3.
Figure 7B:
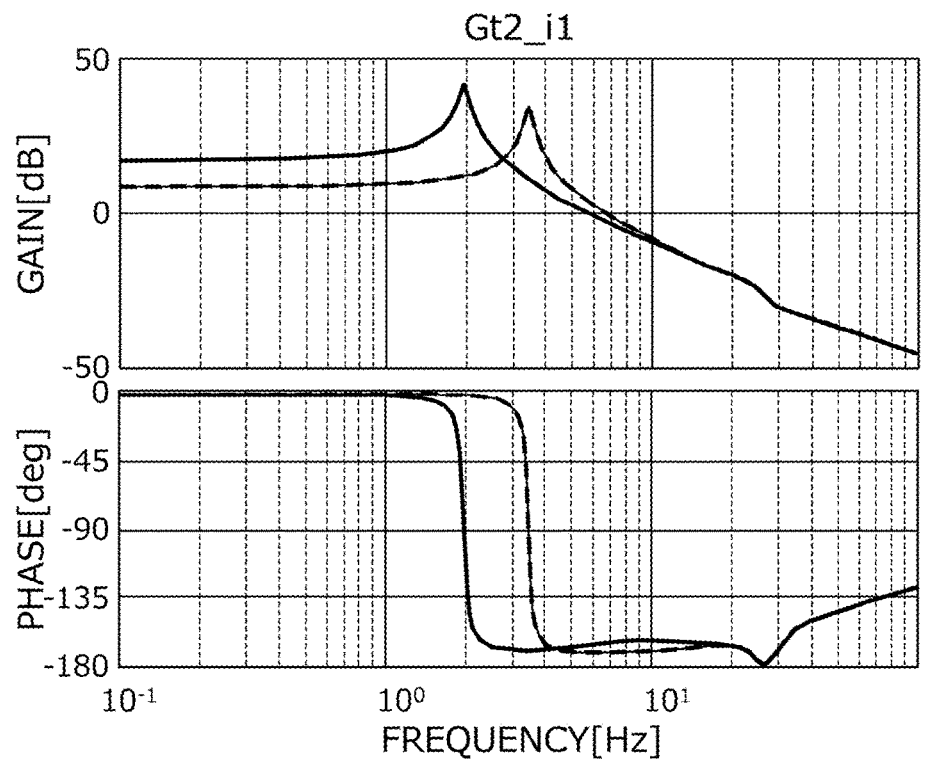
FIG. 7B is a graph illustrating an estimation result (Gt2_i1) in Example 3.
Figure 7C:
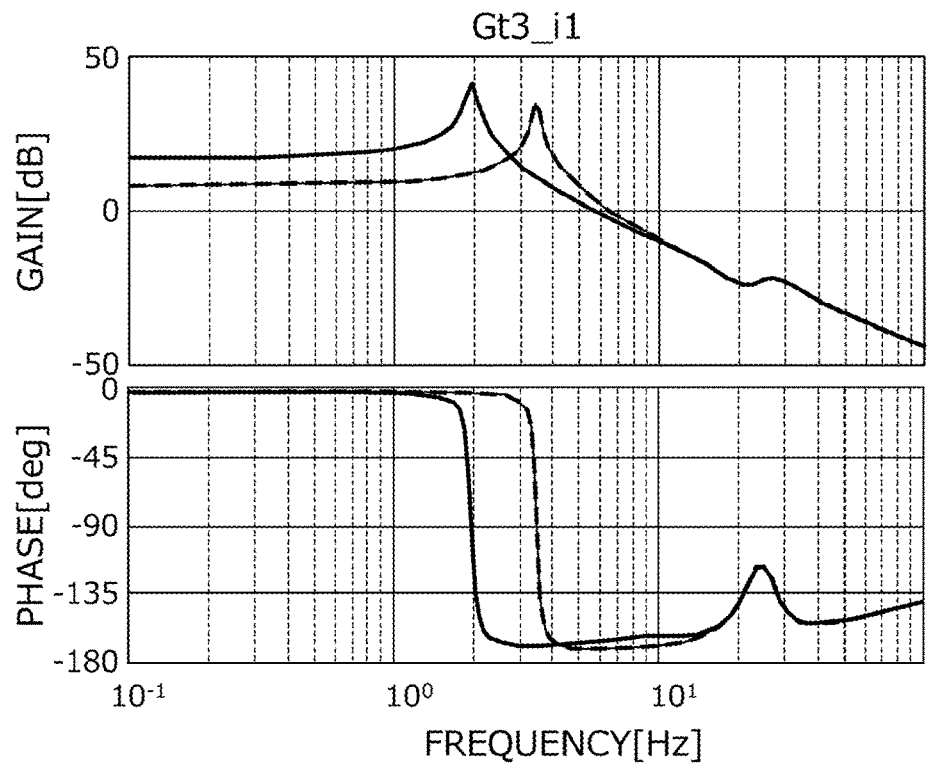
FIG. 7C is a graph illustrating an estimation result (Gt3_i1) in Example 3.
Figure 7D:
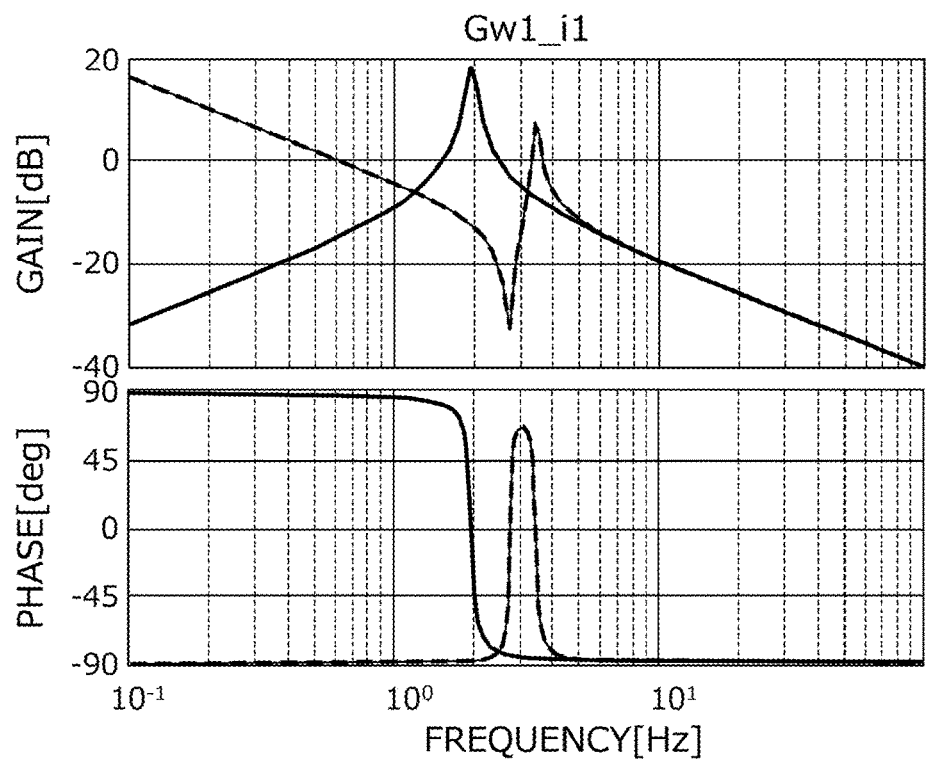
FIG. 7D is a graph illustrating an estimation result (Gw1_i1) in Example 3.
Figure 7E:
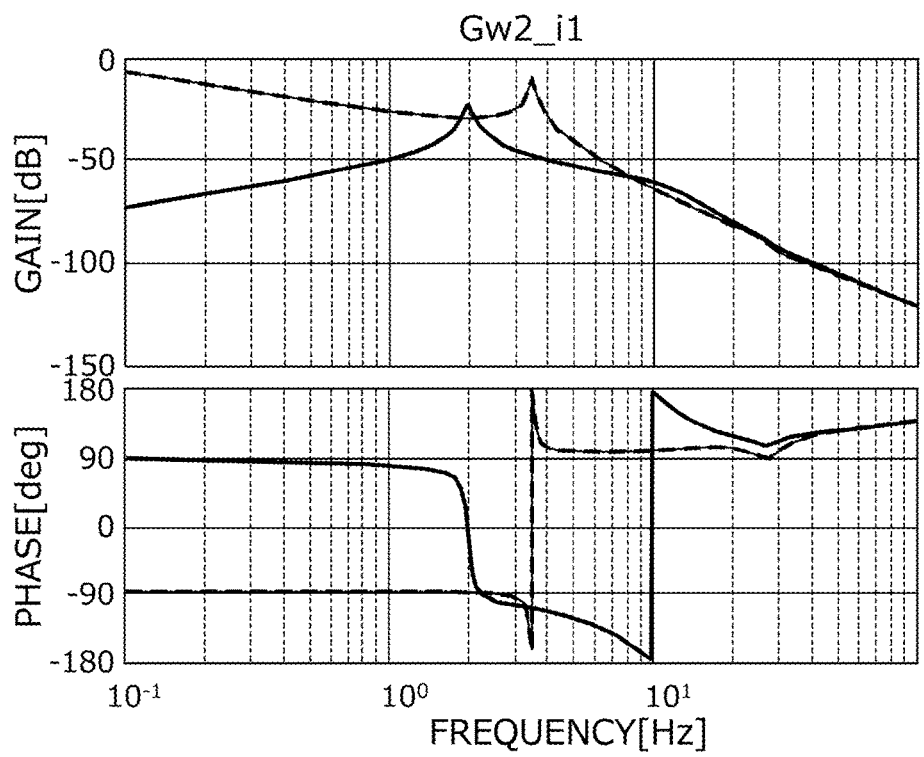
FIG. 7E is a graph illustrating an estimation result (Gw2_i1) in Example 3.
Figure 7F:
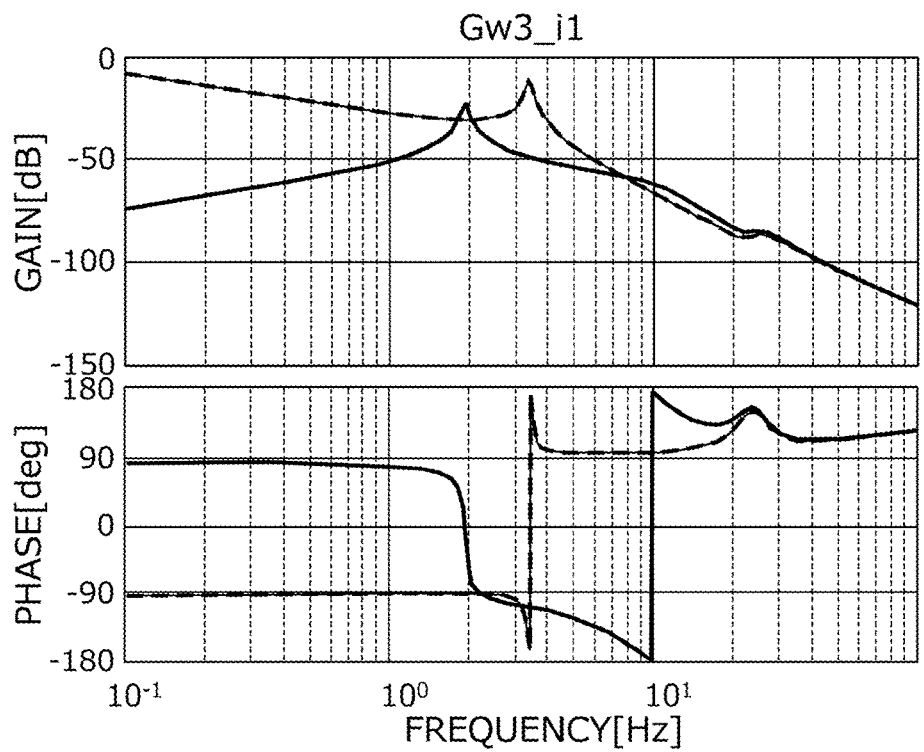
FIG. 7F is a graph illustrating an estimation result (Gw3_i1) in Example 3.
Figure 7G:
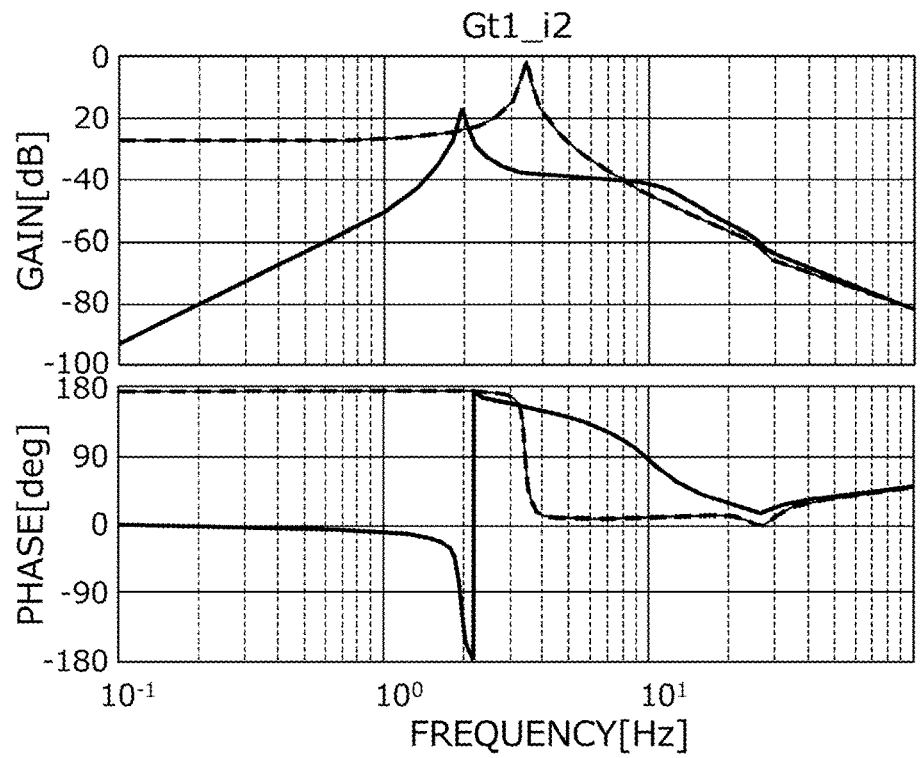
FIG. 7G is a graph illustrating an estimation result (Gt1_i2) in Example 3.
Figure 7H:
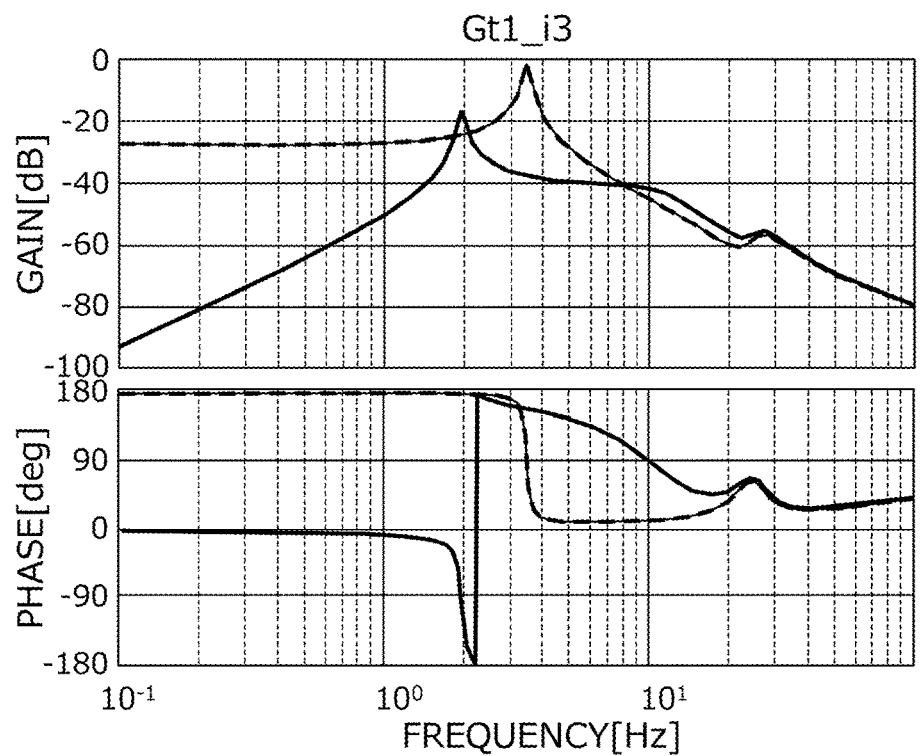
FIG. 7H is a graph illustrating an estimation result (Gt1_i3) in Example 3.
Figure 7I:
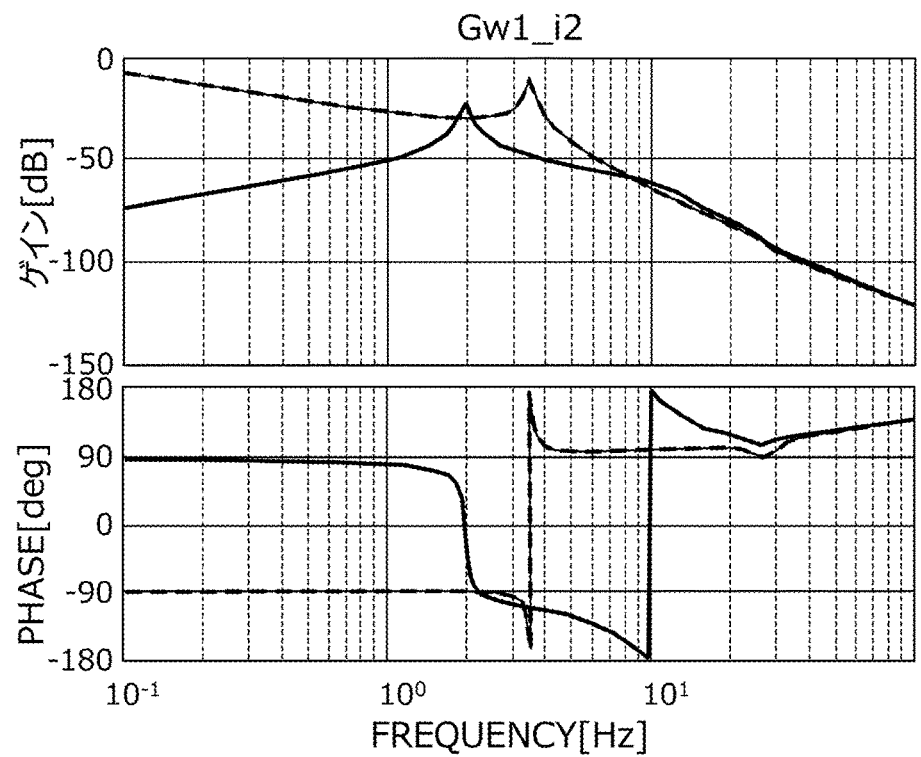
FIG. 7I is a graph illustrating an estimation result (Gw1_i2) in Example 3.
Figure 7J:
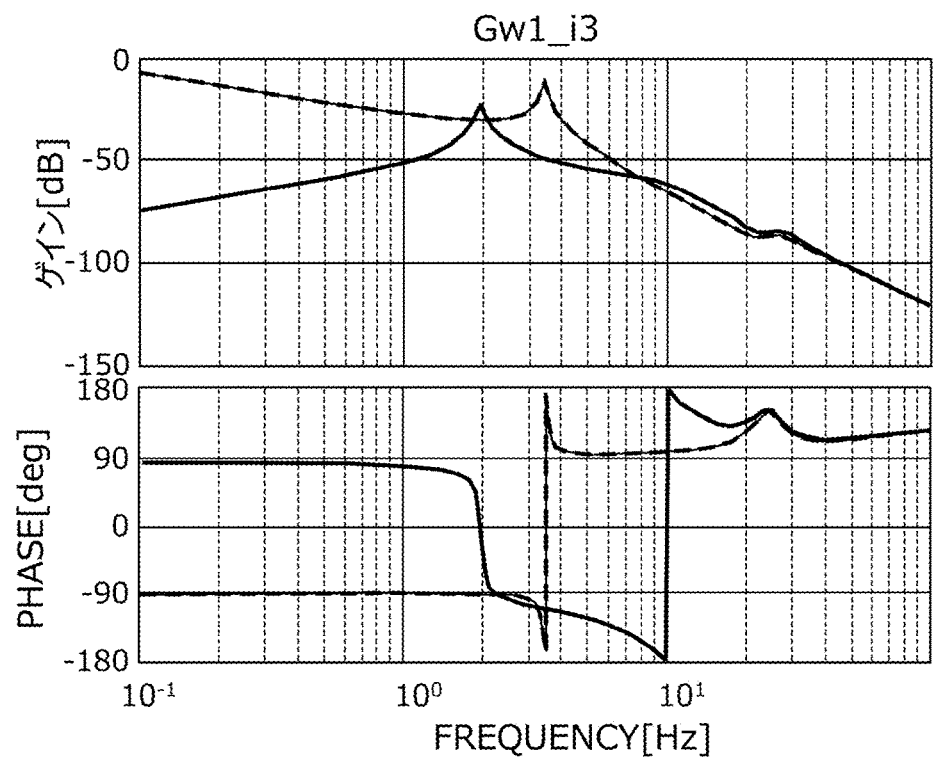
FIG. 7J is a graph illustrating an estimation result (Gw1_i3) in Example 3.

More specifically, FIG. 7A illustrates a Bode diagram of the transfer function Gt1_i1 estimated by Equation (12-1), FIG. 7B illustrates a Bode diagram of the transfer function Gt2_it estimated by Equation (12-4), FIG. 7C illustrates a Bode diagram of the transfer function Gt3_i1 estimated by Equation (12-5), FIG. 7D illustrates a Bode diagram of the transfer function Gw1_i1 estimated by Equation (13-1), FIG. 7E illustrates a Bode diagram of the transfer function Gw2_i1 estimated by Equation (13-4), FIG. 7F illustrates a Bode diagram of the transfer function Gw3_i1 estimated by Equation (13-5), FIG. 7G illustrates a Bode diagram of the transfer function Gt1_i2 estimated by Equation (12-2), FIG. 7H illustrates a Bode diagram of the transfer function Gt1_i3 estimated by Equation (12-3), FIG. 7I illustrates a Bode diagram of the transfer function Gw1_i2 estimated by Equation (13-2), and FIG. 7J illustrates a Bode diagram of the transfer function Gw1_i3 estimated by Equation (13-3). Further, in each of the diagrams, a thin full line indicates a true mechanical characteristic, and a broken line indicates an estimation result by the input/output characteristic estimation method in Example 1.

Moreover, each thick solid line in each of the diagrams indicates an estimation result by a conventional input/output characteristic estimation method. More specifically, the thick solid line in FIG. 7A is a response (i.e., t1d1 in Equation (11-1)) of the first shaft torque detection signal t1 when the excitation torque input d1 is input to the first dynamometer, the thick solid line in FIG. 7B is a response (i.e., t2d1 in Equation (11-3)) of the second shaft torque detection signal t2 when the excitation torque input d1 is input to the first dynamometer, the thick solid line in FIG. 7C is a response (i.e., t3d1 in Equation (11-5)) of the first shaft torque detection signal t1 when the excitation torque input d3 is input to the third dynamometer, the thick solid line in FIG. 7D is a response (i.e., w1d1 in Equation (11-2)) of the first speed detection signal w1 when the excitation torque input d1 is input to the first dynamometer, the thick solid line in FIG. 7E is a response (i.e., w2d1 in Equation (11-4)) of the second speed detection signal w2 when the excitation torque input d1 is input to the first dynamometer, the thick solid line in FIG. 7F is a response (i.e., w3d1 in Equation (11-6)) of the third speed detection signal w3 when the excitation torque input d1 is input to the first dynamometer, the thick solid line in FIG. 7G is a response of the first shaft torque detection signal t1 when the excitation torque input d2 is input to the second dynamometer, the thick solid line in FIG. 7H is a response of the first shaft torque detection signal t1 when the excitation torque input d3 is input to the third dynamometer, the thick solid line in FIG. 7I is a response of the first speed detection signal w1 when the excitation torque input d2 is input to the second dynamometer, and the thick solid line in FIG. 7J is a response of the first speed detection signal w1 when the excitation torque input d3 is input to the third dynamometer.

As illustrated in FIGS. 7A to 7J, a conventional input/output characteristic estimation device is subjected to a characteristic of a speed control device, and cannot obtain a true mechanical characteristic. In contrast, the input/output characteristic estimation method in Example 3 estimates one transfer function by combining a plurality of responses obtained when a plurality of dynamometers connected to a test piece are excitation-controlled, and can thereby estimate an input/output characteristic of a testing system with accuracy while removing a characteristic of the speed control device, as illustrated in FIGS. 7A to 7J.

EXPLANATION OF REFERENCE NUMERALS

S . . . testing system
W . . . test piece
S1 . . . first shaft
S2 . . . second shaft
S3 . . . third shaft
21 . . . first dynamometer
22 . . . second dynamometer
23 . . . third dynamometer
51 . . . first rotation speed detector
52 . . . second rotation speed detector
53 . . . third rotation speed detector
61 . . . first shaft torque detector 62 . . . second shaft torque detector
63 . . . third shaft torque detector
7 . . . dynamometer control device
72 . . . excitation torque generation unit
73 . . . speed control device
8 . . . estimation device The invitation claimed is:

1. An input/output characteristic estimation method for a testing system, the testing system including: a test piece including a first shaft, and a second shaft and a third shaft connected to the first shaft so as to be able to transmit power;
a second electric motor linked to the second shaft;
a third electric motor linked to the third shaft;
a second state detection unit for detecting a state of the second shaft or the second electric motor and generating a second state detection signal;
a third state detection unit for detecting a state of the third shaft or the third electric motor and generating a third state detection signal;
a speed control device which generates a second torque control input to the second electric motor for controlling a rotation speed of the second electric motor and a third torque control input to the third electric motor for controlling a rotation speed of the third electric motor on the basis of a predetermined input signal; and
an excitation input generator for generating an excitation input changing at a predetermined frequency, the input/output characteristic estimation method comprising:
inputting, to the second electric motor as a second input, the second torque control input on which the excitation input is superimposed, also inputting the third torque control input to the third electric motor as a third input, and measuring a response to the excitation input as a first excitation response;
inputting the second torque control input to the second electric motor as a second input, also inputting, to the third electric motor as a third input, the third torque control input on which the excitation input is superimposed, and measuring a response to the excitation input as a second excitation response; and
estimating a transfer function from the second or third input to the second or third state detection signal by using the first excitation response and the second response.

2. The input/output characteristic estimation method for the testing system according to claim 1, further including a transfer function from an input signal to the second or third input in the speed control device is estimated by using the first excitation response and the second excitation response.

3. The input/output characteristic estimation method for the testing system according to claim 1, the testing system further including
a first electric motor linked to the first shaft; and
a first state detection unit for detecting a state of the first shaft or the first electric motor and generating a first state detection signal,
the input/output characteristic estimation method further comprising
inputting, to the first electric motor as a first input, a predetermined reference input on which the excitation input is superimposed, also inputting the second and third torque control inputs to the second and third electric motors as second and third inputs, and measuring a response to the excitation input as a third excitation response, wherein
a transfer function from the first input to the first, second, or third state detection signal or a transfer function from the second or third input to the first state detection signal is estimated by using one or both of the first and second excitation responses and the third excitation response.

4. The input/output characteristic estimation method for the testing system according to claim 1, wherein the second state detection unit includes a second torque detector which detects torque of the second shaft and generates a second torque detection signal, and a second rotation speed detector which detects a rotation speed of the second electric motor and generates a second speed signal,
the third state detection unit includes a third torque detector which detects torque of the third shaft and generates a third torque detection signal, and a third rotation speed detector which detects a rotation speed of the third electric motor and generates a third speed signal, and
the speed control device generates the second and third torque control inputs on the basis of the second and third speed signals,
the first excitation response includes the response of at least either the second or third input to the excitation input superimposed on the second torque control input,
the second excitation response includes the response of at least either the second or third input to the excitation input superimposed on the third torque control input, and
a transfer function from the second or third input to the second or third torque detection signal or the second or third speed signal is estimated by using the first and second excitation responses.

5. The input/output characteristic estimation method for the testing system according to claim 4, wherein the first excitation response includes the responses of the second input, the third input, the second torque detection signal, and the third torque detection signal to the excitation input,
the second excitation response includes the responses of the second input, the third input, the second torque detection signal, and the third torque detection signal to the excitation input, and
a transfer function from the second or third input to the second or third torque detection signal is estimated by using the first and second excitation responses.

6. The input/output characteristic estimation method for the testing system according to claim 4, wherein the first excitation response includes the responses of the second input, the third input, the second speed signal, and the third speed signal to the excitation input,
the second excitation response includes the responses of the second input, the third input, the second speed signal, and the third speed signal to the excitation input, and
a transfer function from the second or third input to the second or third speed signal is estimated by using the first and second excitation responses.

7. An input/output characteristic estimation method for a testing system, the testing system including: a test piece including a first shaft, and a second shaft and a third shaft connected to the first shaft so as to be able to transmit power;
a second electric motor linked to the second shaft;
a third electric motor linked to the third shaft;
a second state detection unit for detecting a state of the second shaft or the second electric motor and generating a second state detection signal;
a third state detection unit for detecting a state of the third shaft or the third electric motor and generating a third state detection signal;

a speed control device which generates a second torque control input to the second electric motor for controlling a rotation speed of the second electric motor and a third torque control input to the third electric motor for controlling a rotation speed of the third electric motor on the basis of a predeteitiiined input signal; and
an excitation input generator for generating an excitation input changing at a predetermined frequency, the input/output characteristic estimation method comprising:
inputting, to the second electric motor as a second input, the second torque control input on which the excitation input is superimposed, also inputting the third torque control input to the third electric motor as a third input, and measuring a response to the excitation input as a first excitation response;
inputting the second torque control input to the second electric motor as a second input, also inputting, to the third electric motor as a third input, the third torque control input on which the excitation input is superimposed, and measuring a response to the excitation input as a second excitation response; and
estimating a transfer function from the input signal to the second or third input in the speed control device by using the first excitation response and the second excitation response.

8. The input/output characteristic estimation method for the testing system according to claim 7, wherein the second state detection unit includes a second torque detector which detects torque of the second shaft and generates a second torque detection signal, and a second rotation speed detector which detects a rotation speed of the second electric motor and generates a second speed signal,
the third state detection unit includes a third torque detector which detects torque of the third shaft and generates a third torque detection signal, and a third rotation speed detector which detects a rotation speed of the third electric motor and generates a third speed signal, and
the speed control device generates the second and third torque control inputs on the basis of the second and third speed signals,
the first excitation response includes the responses of the second and third speed signals to the excitation input superimposed on the second torque control input,
the second excitation response includes the responses of the second and third speed signals to the excitation input superimposed on the third torque control input, and
a transfer function from the second or third speed signal to the second or third input in the speed control device is estimated by using the responses measured in the first and second excitation responses.

9. An input/output characteristic estimation method for a testing system, the testing system including: a test piece including a first shaft, and a second shaft connected to the first shaft so as to be able to transmit power;
a first electric motor linked to the first shaft;
a second electric motor linked to the second shaft;
a first state detection unit for detecting a state of the first shaft or the first electric motor and generating a first state detection signal;
a second state detection unit for detecting a state of the second shaft or the second electric motor and generating a second state detection signal;
a speed control device which generates a second torque control input to the second electric motor for controlling a rotation speed of the second electric motor on the basis of a predetermined input signal; and
an excitation input generator for generating an excitation input changing at a predetermined frequency, the input/output characteristic estimation method comprising:
inputting, to the first electric motor as a first input, a predetermined reference input on which the excitation input is superimposed, also inputting the second torque control input to the second electric motor as a second input, and measuring a response to the excitation input as a first excitation response;
inputting the reference input to the first electric motor as a first input, also inputting, to the second electric motor as a second input, the second torque control input on which the excitation input is superimposed, and measuring a response to the excitation input as a second excitation response; and
estimating a transfer function from the first input to the first or second state detection signal by using the first excitation response and the second excitation response.

10. The input/output characteristic estimation method for the testing system according to claim 9, wherein the first state detection unit includes a first torque detector which detects torque of the first shaft and generates a first torque detection signal, and a first rotation speed detector which detects a rotation speed of the first electric motor and generates a first speed signal,
the second state detection unit includes a second torque detector which detects torque of the second shaft and generates a second torque detection signal, and a second rotation speed detector which detects a rotation speed of the second electric motor and generates a second speed signal,
the first excitation response includes the responses of the first and second speed signals to the excitation input superimposed on the reference input, and
a transfer function from the first input to the first speed signal and a transfer function from the first input to the second speed signal are estimated by using the first and second excitation responses.

11. The input/output characteristic estimation method for the testing system according to claim 9, wherein the first state detection unit includes a first torque detector which detects torque of the first shaft and generates a first torque detection signal, and a first rotation speed detector which detects a rotation speed of the first electric motor and generates a first speed signal,
the second state detection unit includes a second torque detector which detects torque of the second shaft and generates a second torque detection signal, and a second rotation speed detector which detects a rotation speed of the second electric motor and generates a second speed signal,
the first excitation response includes the responses of the second speed signal and the first torque detection signal to the excitation input superimposed on the reference input, and
a transfer function from the first input to the first torque detection signal is estimated by using the first and second excitation responses.

12. The input/output characteristic estimation method for the testing system according to claim 11, wherein the first excitation response includes the responses of the second speed signal and the first and second torque detection signals to the excitation input superimposed on the reference input, and a transfer function from the first input to the first torque detection signal and a transfer function from the first input to the second torque detection signal are estimated by using the first and second excitation responses.

* * * * *